(12) United States Patent
Arendt

(10) Patent No.: US 10,894,342 B2
(45) Date of Patent: Jan. 19, 2021

(54) SYSTEM AND METHOD FOR MOLDING COMESTIBLE BUILDING BLOCKS

(71) Applicant: Kraft Foods Group Brands LLC, Chicago, IL (US)

(72) Inventor: Brian J. Arendt, Chicago, IL (US)

(73) Assignee: Kraft Foods Group Brands LLC, Chicago, IL (US)

( * ) Notice: Subject to any disclaimer, the term of this patent is extended or adjusted under 35 U.S.C. 154(b) by 98 days.

(21) Appl. No.: 15/940,520

(22) Filed: Mar. 29, 2018

(65) Prior Publication Data

US 2019/0299492 A1 Oct. 3, 2019

(51) Int. Cl.
  *B29C 33/00* (2006.01)
  *A63H 33/08* (2006.01)
  *B29C 33/42* (2006.01)
  *A63H 33/04* (2006.01)
  *A63H 33/00* (2006.01)

(52) U.S. Cl.
  CPC ....... *B29C 33/0022* (2013.01); *A63H 33/044* (2013.01); *A63H 33/08* (2013.01); *B29C 33/42* (2013.01); *A63H 33/001* (2013.01)

(58) Field of Classification Search
  CPC .......................... B29C 33/0088; B29C 33/301
  USPC .......................................... 425/441, 588, 116
  See application file for complete search history.

(56) References Cited

U.S. PATENT DOCUMENTS

| | | |
|---|---|---|
| 1,476,910 A | 12/1923 | Naugle |
| 1,900,290 A | 3/1933 | Harold |
| 2,015,496 A | 9/1935 | Washington |
| 2,097,356 A | 10/1937 | Pearl |
| 2,188,492 A | 1/1940 | Young |
| D137,122 S | 1/1944 | De Murguiondo |

(Continued)

FOREIGN PATENT DOCUMENTS

| | | | |
|---|---|---|---|
| GB | 1229174 A | * 4/1971 | ............. F25C 1/243 |
| SU | 406782 | 11/1973 | |

(Continued)

OTHER PUBLICATIONS

"One Set Lego and Robot type Muffin Sweet Candy Jelly fondant Cake chocolate Mold Silicone tool," (Apr. 18, 2016, hereinafter "NPL'1") (Year: 2016).*

(Continued)

*Primary Examiner* — Michael M. Robinson
*Assistant Examiner* — Edgaredmanuel Troche
(74) *Attorney, Agent, or Firm* — Fitch, Even, Tabin & Flannery LLP

(57) ABSTRACT

A mold system includes an upper mold and a lower mold. The upper mold and the lower mold include a base plate having a lower surface and an upper surface. At least one protrusion extends a first height from the lower surface of the base plate to a distal end wall and defines a mold cavity accessible through an opening of the lower base plate. One or more bosses extend a second height from the distal end wall, and at least one support leg extends a third height from the lower surface of the base plate to a terminal end. At least one socket is formed on the upper surface of the lower base plate adjacent the at least one support leg. The mold system is operable between a storage configuration and a molding configuration by rotating the upper mold relative to the lower mold.

20 Claims, 14 Drawing Sheets

(56) References Cited

U.S. PATENT DOCUMENTS

| | | |
|---|---|---|
| 2,514,942 A | 7/1950 | Eaton |
| 2,537,915 A | 1/1951 | Roop |
| 2,756,567 A | 7/1956 | Martin |
| 3,021,695 A * | 2/1962 | Voigtmann .............. F25C 1/243 249/127 |
| 3,197,058 A * | 7/1965 | Hale .................... F25D 25/005 220/23.6 |
| 3,590,728 A | 7/1971 | Stanley |
| 3,638,583 A | 2/1972 | Goodier et al. |
| 3,685,785 A * | 8/1972 | Brown ................... F25C 1/243 249/129 |
| D236,647 S | 9/1975 | Stewart |
| D253,332 S | 11/1979 | Rich |
| D257,817 S | 1/1981 | Young |
| D263,682 S | 4/1982 | Urciuoli |
| 5,191,830 A | 3/1993 | Jacobson |
| 5,366,201 A | 11/1994 | Diaz |
| 5,582,389 A | 12/1996 | Greene |
| 5,683,728 A | 11/1997 | Cerboni |
| 5,830,379 A | 11/1998 | Tunzi |
| 5,921,171 A | 7/1999 | Dreano |
| D439,936 S | 4/2001 | Stenbryggen |
| 6,213,839 B1 | 4/2001 | Pedersen |
| 6,273,778 B1 | 8/2001 | Kyster |
| 6,386,504 B1 | 5/2002 | Schemel |
| 6,389,375 B1 | 5/2002 | Thomsen et al. |
| 6,447,358 B1 | 9/2002 | Mikkelsen et al. |
| 6,461,215 B1 | 10/2002 | Kunz et al. |
| 6,497,602 B2 | 12/2002 | Kroigaard |
| 6,505,809 B1 | 1/2003 | Reed |
| 6,508,689 B1 | 1/2003 | Mikkelsen et al. |
| 6,554,675 B1 | 4/2003 | Nyengaard |
| 6,554,676 B1 | 4/2003 | Bach |
| 6,585,553 B1 | 7/2003 | Fetridge et al. |
| 6,616,500 B1 | 9/2003 | Harms et al. |
| 6,627,238 B1 | 9/2003 | Kim et al. |
| 6,634,920 B1 | 10/2003 | Michaelsen |
| 6,645,033 B1 | 11/2003 | Thomsen |
| 6,682,071 B1 | 1/2004 | Carsten |
| 6,682,385 B2 | 1/2004 | Atzen et al. |
| D487,544 S | 3/2004 | Jessen et al. |
| 6,736,691 B1 | 5/2004 | Bach |
| 6,743,008 B2 | 6/2004 | Dreano |
| D494,408 S | 8/2004 | Hinton et al. |
| D494,642 S | 8/2004 | Bresciani et al. |
| D494,643 S | 8/2004 | Bresciani et al. |
| D495,764 S | 9/2004 | Bresciani et al. |
| 6,814,643 B1 | 11/2004 | Dooley et al. |
| 6,869,059 B2 | 3/2005 | Sloan et al. |
| D507,147 S | 7/2005 | Land |
| D507,451 S | 7/2005 | Land |
| D508,632 S | 8/2005 | Nolan |
| 6,939,192 B1 | 9/2005 | Munch et al. |
| D522,611 S | 6/2006 | Carder, Sr. et al. |
| D527,217 S | 8/2006 | Morgan |
| 7,092,899 B2 | 8/2006 | Simas et al. |
| 7,118,368 B2 | 10/2006 | Dreano |
| 7,131,626 B2 | 11/2006 | Cole |
| D534,632 S | 1/2007 | David et al. |
| 7,175,417 B2 | 2/2007 | Labruno et al. |
| D539,364 S | 3/2007 | Sofussen |
| D543,797 S | 6/2007 | Kaposi |
| D545,924 S | 7/2007 | Wilson et al. |
| D546,902 S | 7/2007 | Ganderton |
| D546,903 S | 7/2007 | Wilson et al. |
| D547,394 S | 7/2007 | Toft |
| 7,289,774 B2 | 10/2007 | Jorgensen |
| 7,329,166 B2 | 2/2008 | Hatting et al. |
| D574,180 S | 8/2008 | Broom |
| 7,439,972 B2 | 10/2008 | Timcenko |
| D582,200 S | 12/2008 | Chandler |
| D582,717 S | 12/2008 | Chandler |
| 7,480,597 B2 | 1/2009 | Clark et al. |
| D587,518 S | 3/2009 | Courington et al. |
| D587,765 S | 3/2009 | Dawes |
| D595,998 S | 7/2009 | Hauser |
| D596,450 S | 7/2009 | Nolan |
| D599,614 S | 9/2009 | Swinford et al. |
| 7,596,473 B2 | 9/2009 | Hansen et al. |
| D604,100 S | 11/2009 | Mishan |
| D605,459 S | 12/2009 | Mault et al. |
| D607,064 S | 12/2009 | Thorsen |
| 7,625,261 B2 | 12/2009 | Andersen et al. |
| D611,108 S | 3/2010 | Bodin |
| D614,249 S | 4/2010 | Pedersen |
| D614,250 S | 4/2010 | Frederiksen |
| D614,252 S | 4/2010 | Pilgaard |
| 7,695,338 B2 | 4/2010 | Dooley et al. |
| 7,708,615 B2 | 5/2010 | Munch |
| D616,698 S | 6/2010 | Lion et al. |
| D617,396 S | 6/2010 | Nielsen |
| 7,731,191 B2 | 6/2010 | Sternberg |
| 7,755,620 B2 | 7/2010 | Sherer et al. |
| D621,651 S | 8/2010 | Bryce et al. |
| D625,546 S | 10/2010 | Henry et al. |
| D630,264 S | 1/2011 | Ryaa |
| D630,272 S | 1/2011 | Clausen |
| D630,685 S | 1/2011 | Bodin et al. |
| 7,913,970 B2 | 3/2011 | Bennet et al. |
| 7,979,251 B2 | 7/2011 | Jakobsen et al. |
| D651,450 S | 1/2012 | Pallotto |
| D652,087 S | 1/2012 | Dawes |
| 8,091,892 B2 | 1/2012 | Sternberg |
| 8,240,939 B2 | 8/2012 | Uttley et al. |
| D667,508 S | 9/2012 | Frederiksen |
| D667,681 S | 9/2012 | Carsten |
| D672,191 S | 12/2012 | Hollinger |
| D672,212 S | 12/2012 | Augis |
| D672,401 S | 12/2012 | Dawes |
| D672,405 S | 12/2012 | Macadam |
| D672,406 S | 12/2012 | Sas |
| D672,410 S | 12/2012 | Dubreuil et al. |
| D672,601 S | 12/2012 | Hollinger |
| D673,002 S | 12/2012 | Hollinger |
| D675,681 S | 2/2013 | Rottje |
| 8,374,829 B2 | 2/2013 | Jakobsen et al. |
| D677,973 S | 3/2013 | Smallegan |
| D680,818 S | 4/2013 | Augis |
| 8,408,549 B2 | 4/2013 | Howard et al. |
| D684,417 S | 6/2013 | Barber |
| D684,809 S | 6/2013 | Barber |
| D688,104 S | 8/2013 | Muspratt-Williams |
| D689,558 S | 9/2013 | Jensen |
| D689,568 S | 9/2013 | Pilgaard et al. |
| D689,953 S | 9/2013 | Jensen |
| D689,955 S | 9/2013 | Jensen |
| 8,579,536 B2 | 11/2013 | Uttley et al. |
| D695,850 S | 12/2013 | Andersen |
| D696,360 S | 12/2013 | Holm |
| 8,628,085 B2 | 1/2014 | Sternberg |
| D701,919 S | 4/2014 | Madsen |
| D701,923 S | 4/2014 | Jensen |
| D701,925 S | 4/2014 | Jensen |
| D702,076 S | 4/2014 | Endres et al. |
| D702,077 S | 4/2014 | Endres et al. |
| D702,484 S | 4/2014 | Endres et al. |
| D702,485 S | 4/2014 | Endres et al. |
| 8,701,552 B2 | 4/2014 | Hanson |
| D706,316 S | 6/2014 | Hoyord et al. |
| D707,756 S | 6/2014 | Jensen |
| 8,753,163 B2 | 6/2014 | Gaute |
| 8,753,164 B2 | 6/2014 | Hansen et al. |
| D708,006 S | 7/2014 | Smallegan |
| D708,891 S | 7/2014 | Smallegan |
| D711,680 S | 8/2014 | Masse |
| 8,870,151 B1 | 10/2014 | Mayernick |
| 8,894,066 B2 | 11/2014 | Sternberg |
| D724,904 S | 3/2015 | Chinon et al. |
| D726,513 S | 4/2015 | Zila |
| D731,262 S | 6/2015 | Zila |
| D731,263 S | 6/2015 | Zila |
| D731,595 S | 6/2015 | Jensen |
| D731,596 S | 6/2015 | Jensen |
| D731,597 S | 6/2015 | Jensen |

(56) References Cited

U.S. PATENT DOCUMENTS

| | | | |
|---|---|---|---|
| D731,598 S | 6/2015 | Skov | |
| D731,599 S | 6/2015 | Pilgaard | |
| 9,144,749 B2 | 9/2015 | Munch et al. | |
| 9,149,733 B2 | 10/2015 | Kraag Henriksen | |
| 9,186,591 B2 | 11/2015 | Nielsen | |
| 9,230,360 B2 | 1/2016 | Jakobsen et al. | |
| D749,890 S | 2/2016 | Person | |
| D750,452 S | 3/2016 | Liberman | |
| D757,861 S | 5/2016 | Ryaa | |
| D757,862 S | 5/2016 | Ryaa | |
| D759,735 S | 6/2016 | Tsai | |
| D771,199 S | 11/2016 | Ryaa | |
| 9,511,302 B2 | 12/2016 | Hoe | |
| D784,454 S | 4/2017 | Madsen | |
| D787,568 S | 5/2017 | Davies | |
| D794,139 S | 8/2017 | Barbiani et al. | |
| D803,638 S | 11/2017 | Murray, Jr. | |
| 9,821,242 B2 | 11/2017 | Mathyala et al. | |
| 9,821,245 B2 | 11/2017 | Larsen et al. | |
| 9,827,507 B2 | 11/2017 | Muthyala et al. | |
| D815,883 S | 4/2018 | Parrish | |
| 2003/0192897 A1 | 10/2003 | Stapleton | |
| 2004/0036004 A1 | 2/2004 | De Groote | |
| 2005/0095334 A1 | 5/2005 | Messina | |
| 2013/0017753 A1 | 1/2013 | Pedersen | |
| 2013/0129890 A1 | 5/2013 | Cox | |
| 2013/0330999 A1 | 12/2013 | Ryaa | |
| 2014/0004222 A1 | 1/2014 | Sorensen | |
| 2014/0148076 A1 | 5/2014 | Rottjer et al. | |
| 2014/0244018 A1 | 8/2014 | Bach et al. | |
| 2015/0001761 A1* | 1/2015 | Bratton | B28B 7/06 264/299 |
| 2015/0004871 A1 | 1/2015 | Laursen | |
| 2015/0190711 A1 | 7/2015 | Sternberg | |
| 2015/0190724 A1 | 7/2015 | Licht | |
| 2015/0224416 A1 | 8/2015 | Schildknecht Hoe | |
| 2016/0016086 A1 | 1/2016 | Garling | |
| 2016/0317940 A1 | 11/2016 | Jensen | |
| 2017/0144083 A1 | 5/2017 | Kaersgaard et al. | |
| 2017/0160832 A1 | 6/2017 | Fogtmann et al. | |
| 2017/0189797 A1 | 7/2017 | Muthyala et al. | |
| 2017/0225073 A1 | 8/2017 | Lauland et al. | |
| 2017/0296938 A1 | 10/2017 | Dawes | |
| 2017/0304732 A1 | 10/2017 | Velic et al. | |

FOREIGN PATENT DOCUMENTS

| | | |
|---|---|---|
| SU | 406782 A1 * | 11/1973 |
| WO | WO 2013/017377 | 2/2013 |
| WO | 2015132586 A1 | 9/2015 |
| WO | 2015180733 A1 | 12/2015 |
| WO | 2015180734 A1 | 12/2015 |
| WO | 2015180735 A1 | 12/2015 |
| WO | 2015193840 A1 | 12/2015 |
| WO | 2016000720 A1 | 1/2016 |
| WO | 2016037977 A1 | 3/2016 |
| WO | 2016037978 A1 | 3/2016 |
| WO | 2016050757 A1 | 4/2016 |
| WO | 2016057157 A1 | 4/2016 |
| WO | 2016062671 A1 | 4/2016 |
| WO | 2016075081 A1 | 5/2016 |
| WO | 2016079058 A1 | 5/2016 |
| WO | 2016086940 A1 | 6/2016 |
| WO | 2016113293 A1 | 7/2016 |
| WO | 2016113294 A1 | 7/2016 |
| WO | 2016116108 A1 | 7/2016 |
| WO | 2016116109 A1 | 7/2016 |
| WO | 2016116556 A1 | 7/2016 |
| WO | 2016123637 A2 | 8/2016 |
| WO | 2016124584 A2 | 8/2016 |
| WO | 2016156484 A1 | 10/2016 |
| WO | 2016162403 A1 | 10/2016 |
| WO | 2016177823 A1 | 11/2016 |
| WO | 2017029279 A1 | 2/2017 |
| WO | 2017037301 A1 | 3/2017 |
| WO | 2017037302 A1 | 3/2017 |
| WO | 2017167862 A1 | 10/2017 |
| WO | 2017175872 A1 | 10/2017 |
| WO | 2017194439 A1 | 11/2017 |

OTHER PUBLICATIONS

Chewable Structure,Best Food Gifts: Gummy LEGO Candy Christmas Tree, Dec. 6, 2017; https://www.chewablestructures.com/best-food-gifts-gummy-lego-candy-christmas-tree-chewable-structures (Year: 2017).*

English Translation from Espacenet for SU-406782-A1 (Year: 1973).*

The Modern Gummy. https://www.amazon.com/STACKING-Building-Modern-Gummy-Silicone/dp/B01EJXT5Y0; retrieved Mar. 28, 2018.

Lego Ice Brick Tray. https://shop.lego.com/en-US/LEGO-Ice-Brick-Tray-Red-852768; retrieved Mar. 28, 2018.

International Search Report for PCT/US2019/023128 dated Jul. 4, 2019.

8pc Candy Molds for Lego Lovers, Chocolate Molds, Ice Cube. http://www.amazon.com/Lovers-Chocolate-Silicone-PREMIUM-building-dp/B011220KW2/ref=zg_bsnr_289668_4. JPO Design Division Prior Art Disclosure No. HJ27029858.

Teika Soap & Candle making, Fondant Tools, Chocolate Molds. http://www.amazon.com/Teika-Candle-Making-Fondant-Chocolate/dp/B00OOSV6MK/ref=zg_bsnr_289668_39. JPO Design Division Prior Art Disclosure No. HJ26059059.

"2012 Lunch Goods" p. 6 , SLIC-100 B, JPO Design Division Prior Art Disclosure No. HC25004267.

Americas Best Buys Silicone Candy Molds for Lego Lovers with Recipe eBook, May 17, 2016, https://www.amazon.com/Americas-Best-Buys-Silicone-Lovers/dp/B01EMYO2QM/ref=cm_cr_arp_d_product_top?ie=UTF8 (Year:2016).

* cited by examiner

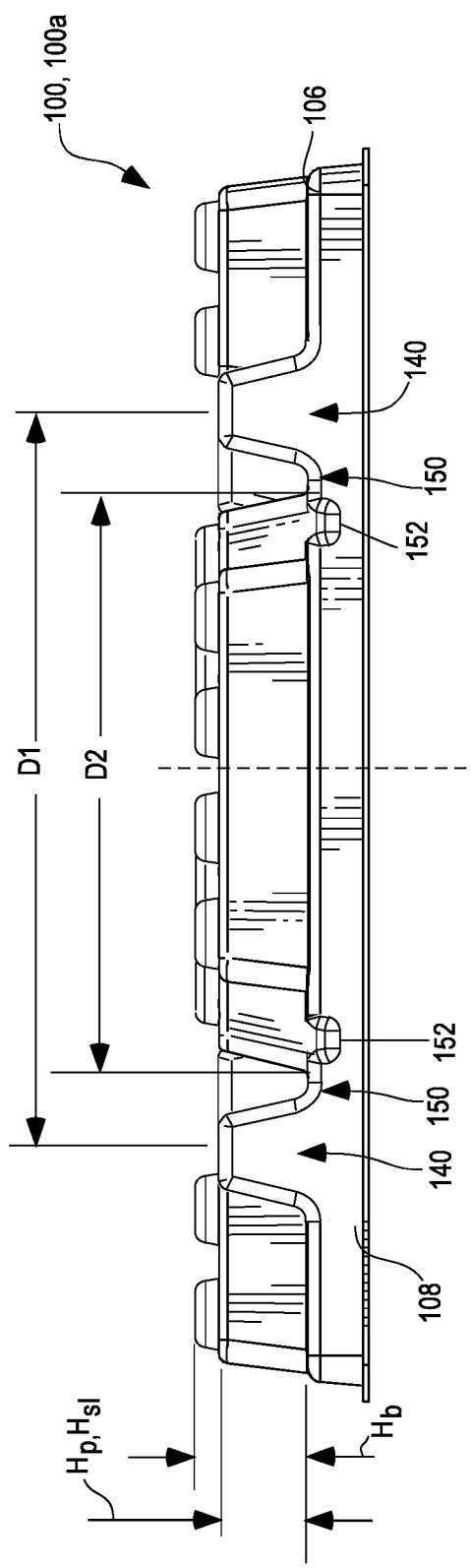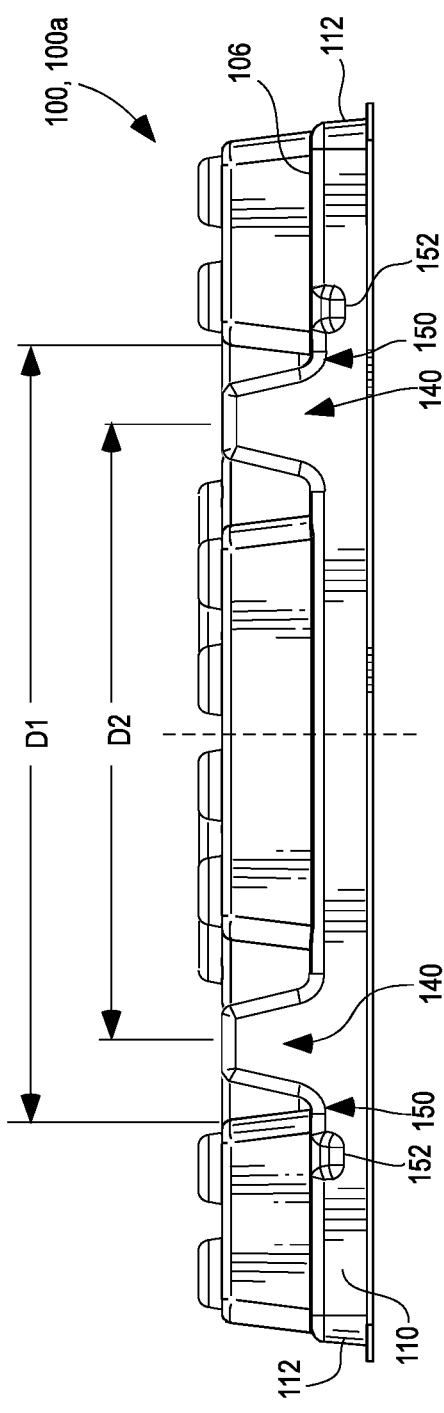

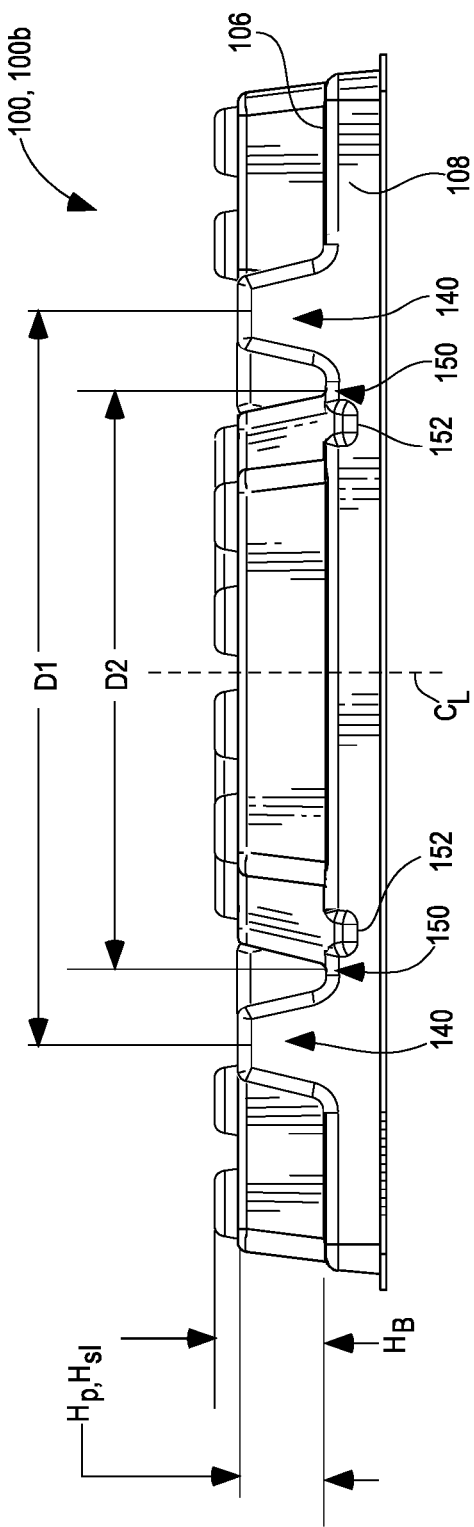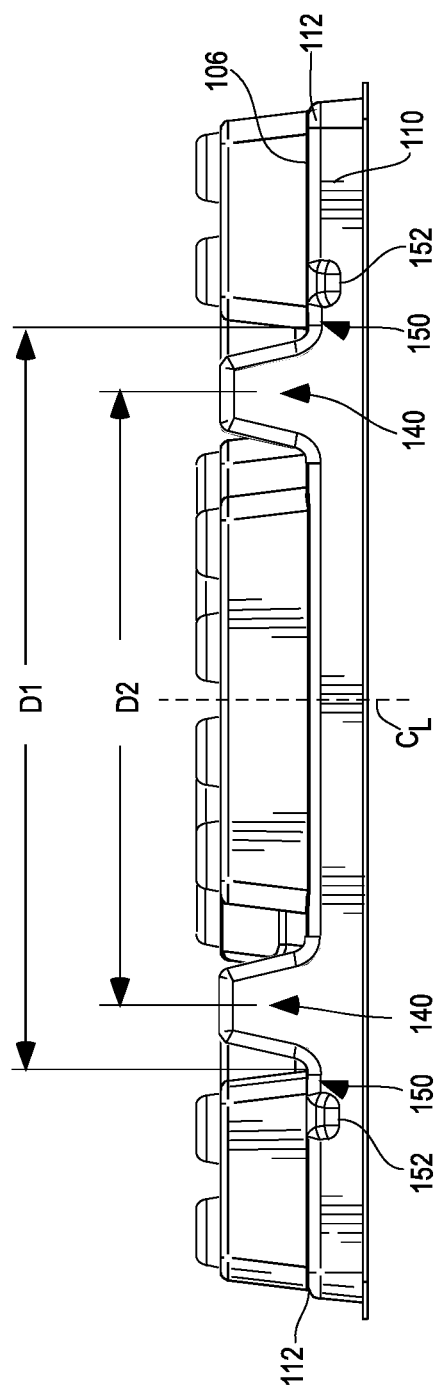

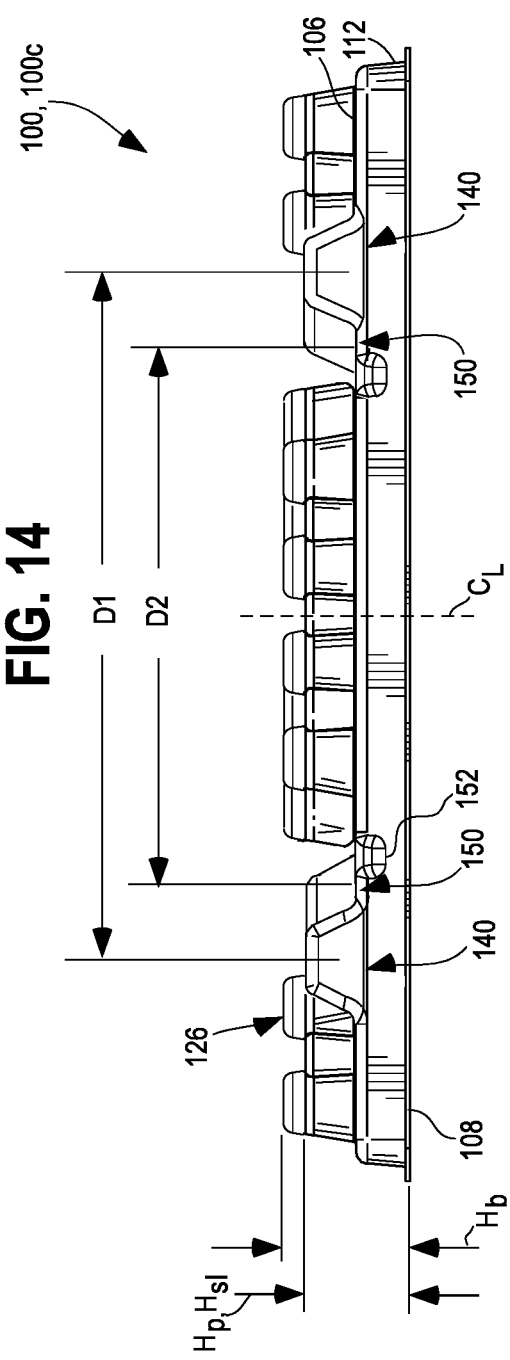
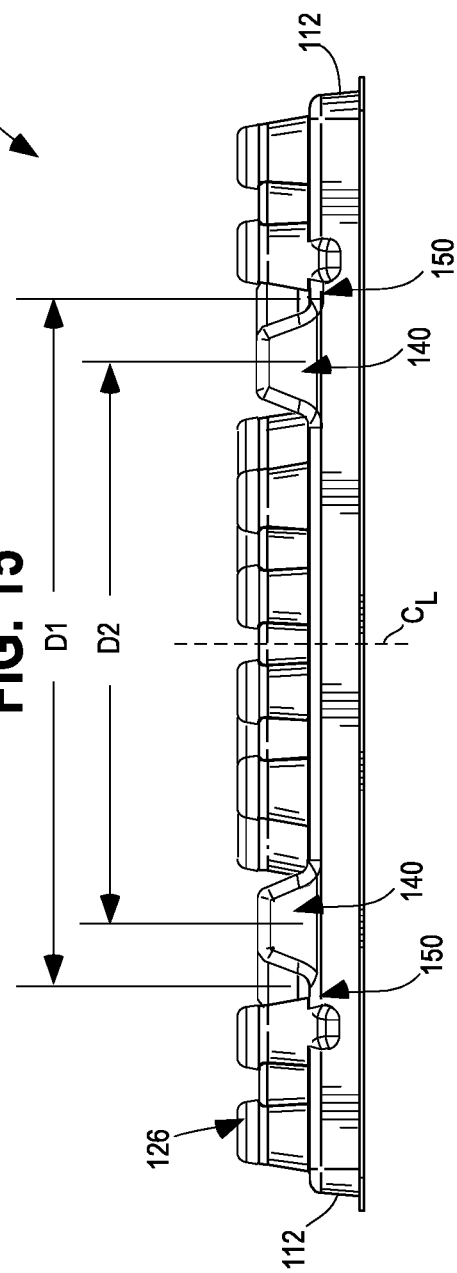

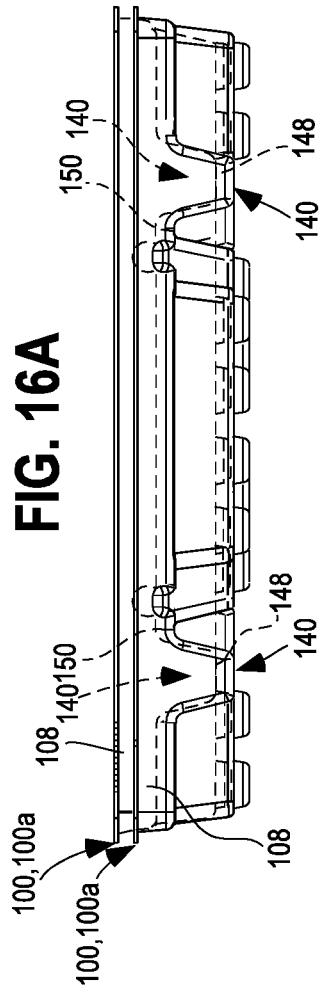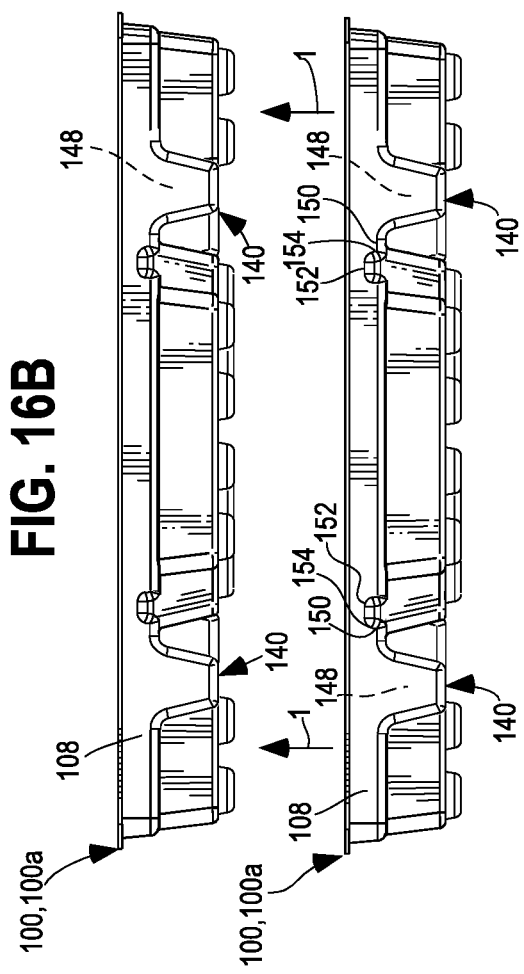

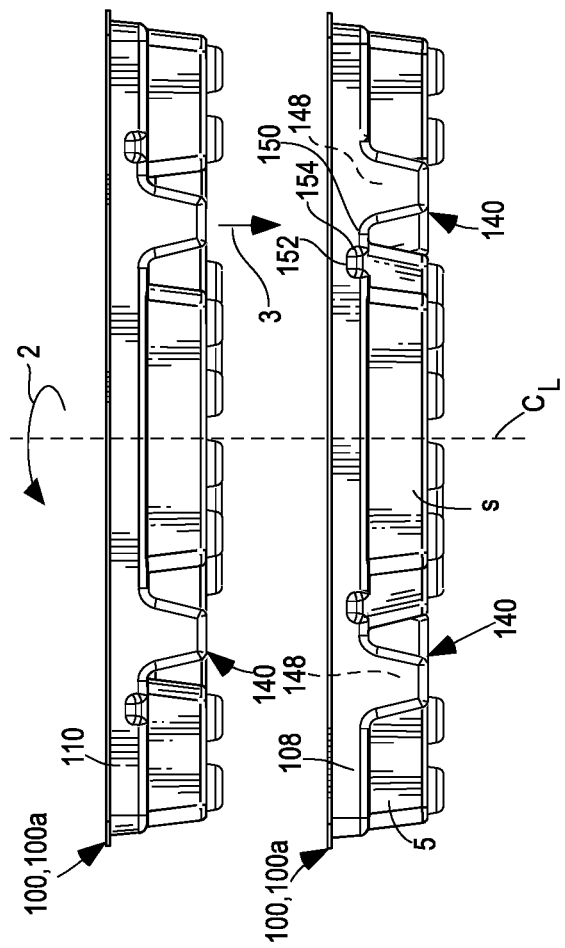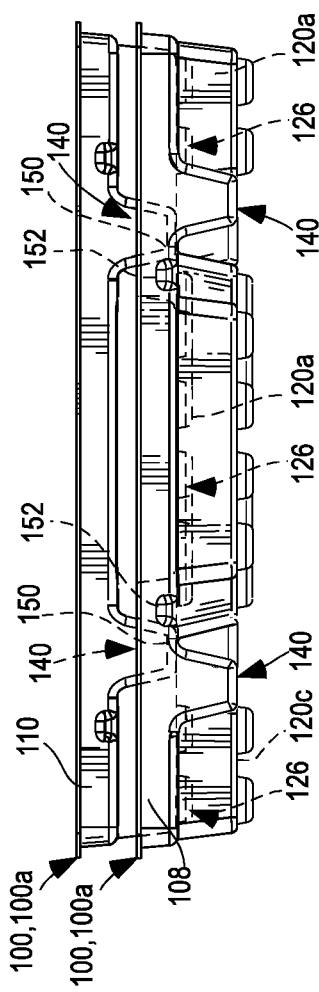

SYSTEM AND METHOD FOR MOLDING COMESTIBLE BUILDING BLOCKS

TECHNICAL FIELD

This disclosure relates to a system and method for forming comestible building blocks.

BACKGROUND

Molds for forming comestibles are often provided with one or more cavities for imparting a desired shape to the molded comestible. Generally, the cavities are provided as recesses within a tray or plate and have an upward-facing opening for receiving an uncured comestible solution. The cavities of each mold may provide a negative mold profile to be imparted to the comestible.

SUMMARY

One aspect of the disclosure provides a mold system. The mold system includes a lower mold having a lower base plate including a lower surface and an upper surface disposed on an opposite side thereof. At least one protrusion extends a first height from the lower surface of the lower base plate to a distal end wall and defines a mold cavity accessible through an opening of the lower base plate. One or more bosses extend a second height from the distal end wall, and at least one support leg extends a third height from the lower surface of the lower base plate to a terminal end. At least one socket is formed on the upper surface of the lower base plate adjacent the at least one support leg.

Implementations of the disclosure may include one or more of the following optional features. In some implementations, the at least one support leg includes a first pair of support legs extending the third height from the lower surface adjacent to a first end of the lower base plate. The first pair of support legs are spaced apart from each other by a first distance along the first end. A second pair of support legs extend the third height from the lower surface adjacent to a second end of the lower base plate and are spaced apart from each other by a second distance along the second end. Here, the first distance is greater than the second distance.

In some examples, the at least one socket includes a first pair of sockets formed on the upper surface adjacent to the first end of the lower base plate. The first pair of sockets are spaced apart from each other by the second distance along the first end. The at least one socket further includes a second pair of sockets formed on the upper surface adjacent to the second end of the lower base plate. The second pair of sockets are spaced apart from each other by the first distance along the second end.

In some implementations, the mold system includes an upper mold including an upper base plate having a second lower surface and a second upper surface disposed on an opposite side thereof. A plurality of the bosses extend a fourth height from the second lower surface, and a third pair of support legs extend a fifth height from the second lower surface adjacent to a third end of the upper base plate. The third pair of support legs are spaced apart from each other by the first distance along the third end. A fourth pair of support legs extend the fifth height from the second lower surface adjacent to a fourth end of the upper base plate. The fourth pair of support legs are spaced apart from each other by the second distance along the fourth end.

In some examples, the at least one protrusion includes a plurality of protrusions each having a mold cavity, the mold cavities collectively defining a mold cavity volume. Further, the mold system may include a comestible ingredient for forming a volume of a comestible solution for filling the mold cavity volume.

In some examples, each of the one or more bosses defines a recess in communication with the mold cavity.

Further, the mold cavity may be defined by one or more sidewalls of the protrusion extending from the lower surface of the lower base plate to the distal end wall at an oblique angle with respect to the lower base plate.

In some implementations, the third height of the support leg is equal to the first height of the protrusion. Further, at least one protrusion includes a first protrusion each having a first quantity of the bosses and a second protrusion having a second quantity of the bosses.

Another aspect of the disclosure may include a mold system having a lower mold including a lower base plate including a lower surface and an upper surface disposed on an opposite side thereof. A lower protrusion extends a first height from the lower surface of the lower base plate to a first distal end wall and defines a mold cavity accessible through an opening formed through the lower base plate. A lower support leg extends the first height from the lower surface of the lower base plate and defines a void. A socket is formed on the upper surface of the lower base plate. Here, the system further includes an upper mold having an upper base plate including a lower surface and an upper surface disposed on an opposite side thereof. At least one upper protrusion extends the first height from the lower surface of the upper base plate to a second distal end wall, one or more bosses extending from the second distal end wall, and an upper support leg extends the first height from the lower surface of the upper base plate to a terminal end.

Implementations of this aspect of the disclosure may include one or more of the following optional features. In some implementations, the at least one upper support leg may include a first pair of upper support legs extending the first height from the lower surface of the upper base plate adjacent to a first end of the upper mold, which are spaced apart from each other by a first distance along the first end. The at least one upper support leg may further include a second pair of upper support legs extending the first height from the lower surface of the upper base plate adjacent to a second end of the upper mold, which are spaced apart from each other by a second distance along the second end. Here, the first distance is greater than the second distance.

In some examples, the at least one socket of the mold system may include a first pair of sockets formed in the upper surface of the lower base plate adjacent to a third end of the lower mold, which are spaced apart from each other by the first distance along the third end. The at least one socket further includes a second pair of sockets formed in the upper surface of the lower base plate adjacent to a fourth end of the lower mold, which are spaced apart from each other by the second distance along the fourth end.

In some implementations, the mold system is operable between a storage configuration and a molding configuration, the storage configuration having the distal end of the upper support leg received within the void of the lower support leg when the upper mold is in a first orientation with respect to the lower mold, and the molding configuration having the distal end of the upper support leg received within the socket when the upper mold is in a second orientation with respect to the lower mold. Further, in the second orientation the upper mold is rotated 180 degrees with respect to the first orientation. In some examples, in the storage configuration the upper protrusion is received within the mold cavity of the lower protrusion, and in the molding configuration the upper protrusion is disposed above the mold cavity and the one or more bosses are disposed within the mold cavity.

In some implementations, the at least one lower protrusion includes a first lower protrusion having a first plurality of the bosses and a second lower protrusion having a second plurality of the bosses. Further, the mold cavity is defined by one or more sidewalls extending at an oblique angle with respect to the upper base plate.

At least one lower protrusion may include a plurality of lower protrusions defining a plurality of mold cavities collectively defining a first volume. In some examples, the mold system may include a comestible ingredient for forming a volume of a comestible solution equal to the first volume of the mold cavities.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 6 is a front elevation view of the mold of FIG. 3, showing a first end of the mold;

FIG. 7 is a rear elevation view of the mold of FIG. 3, showing a second end of the mold;

FIG. 10 is a front elevation view of the mold of FIG. 8, showing a first end of the mold;

FIG. 11 is a rear elevation view of the mold of FIG. 8, showing a second end of the mold;

FIG. 14 is a front elevation view of the mold of FIG. 12, showing a first end of the mold;

FIG. 15 is a rear elevation view of the mold of FIG. 12, showing a second end of the mold;

FIG. 16A is a side elevation view of the a system in accordance with the present disclosure, wherein the system is in a storage configuration having an upper mold of the system is nested within a lower mold of the system;

FIG. 16B is a side elevation view of the system of FIG. 16A, wherein the system is in an intermediate configuration having the upper mold lifted from the lower mold;

FIG. 16C is a side elevation view of the system of FIG. 16A, wherein the system is in a second intermediate configuration having the upper mold rotated 180 degrees about a vertical axis; and FIG. 16D is a side elevation view of the system of FIG. 16A, wherein the system is in a molding configuration having the upper mold stacked upon the lower mold.

Like reference symbols in the various drawings indicate like elements.

DETAILED DESCRIPTION

Figure 1:
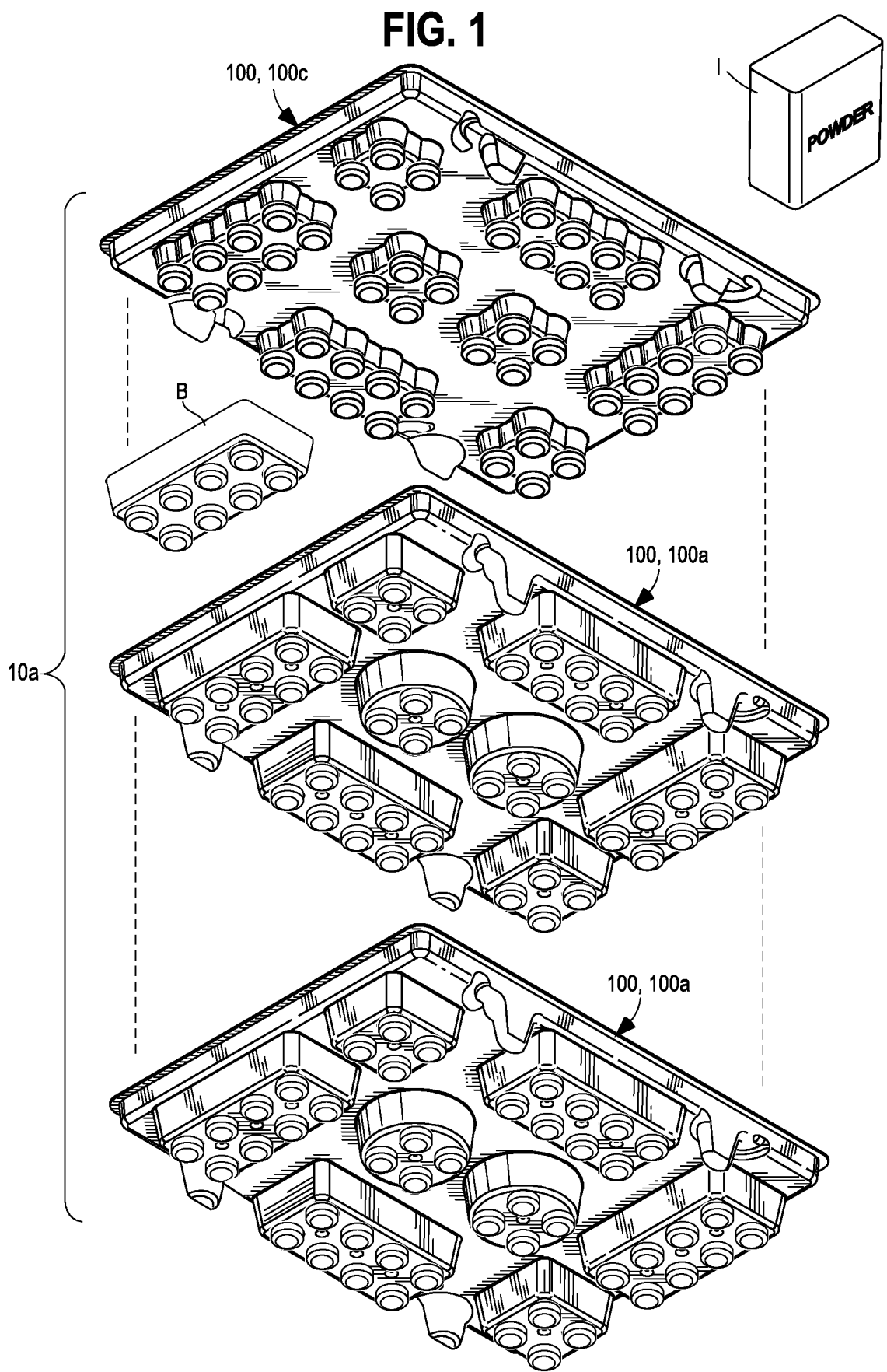
FIG. 1 is perspective view of an example of a molding system in accordance with principles of the present disclosure.
Figure 2:
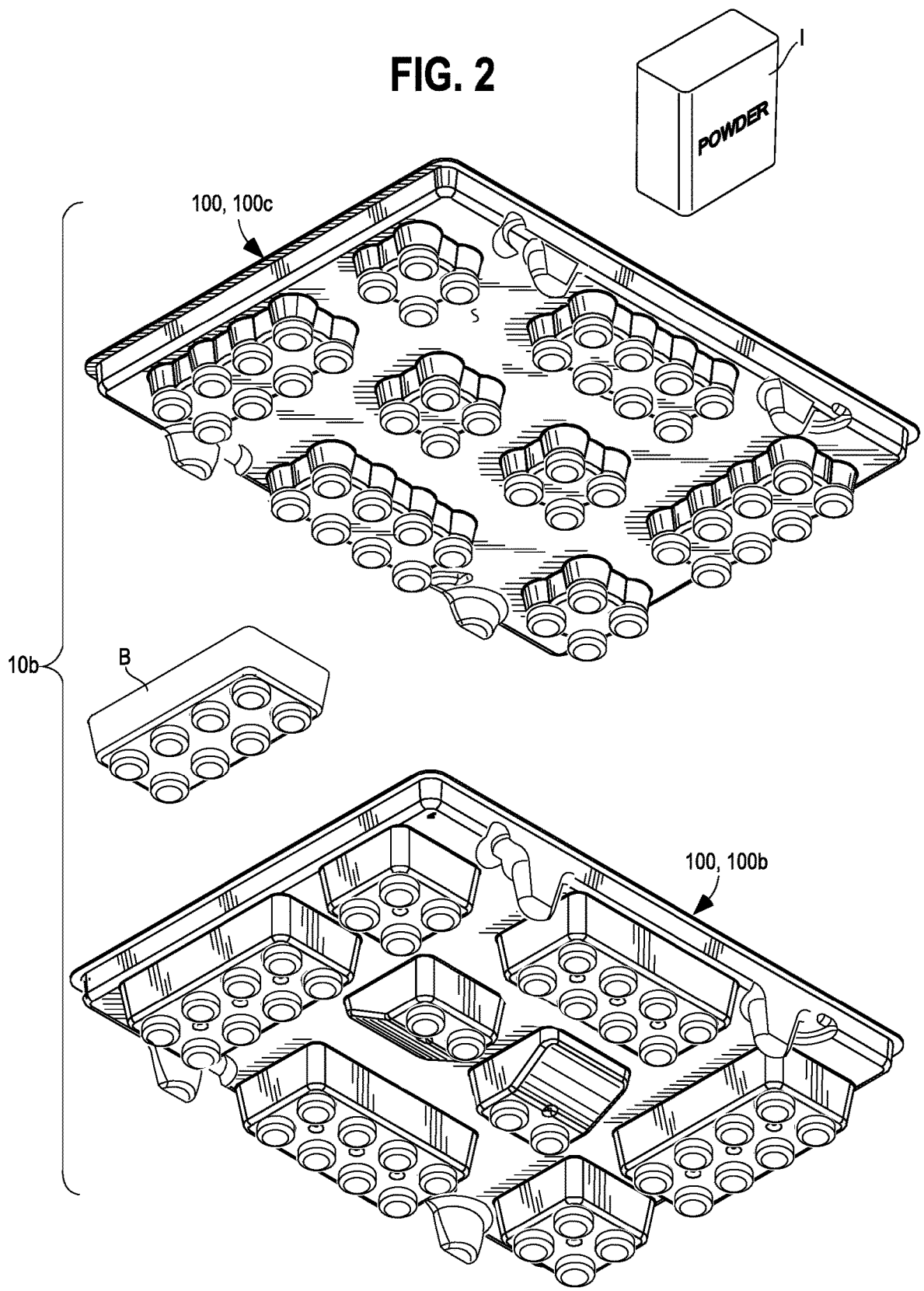
FIG. 2 is a perspective view of another example of a molding system in accordance with the principles of the present disclosure.

Example configurations will now be described more fully with reference to the accompanying drawings. Referring to FIGS. 1 and 2, in some implementations, a system 10, 10a, 10b for molding comestible blocks B includes a plurality of molds 100, 100a-100c configured to be consecutively stacked with each other to form a variety of the comestible blocks B. In some examples, the system 10a includes a pair of identical molds 100a and a cover mold 100c configured to be consecutively stacked to form a desired quantity of the comestible blocks B. In other examples, the system 10b may include molds 100b, 100c having different configurations, as discussed in greater detail below. Additionally or alternatively, the system 10b may include a combination of different ones of the molds 100a, 100b, 100c for forming a variety of the edible blocks.

With reference to FIGS. 3-15, three examples of molds 100, 100a-100c according the principals of the instant disclosure are illustrated. The mold 100, 100a-100c includes a base plate 102 having an upper surface 104 and a lower surface 106 formed on an opposite side of the base plate 102 from the upper surface 104, whereby a distance between the upper surface 104 and the lower surface 106 defines a thickness of the base plate 102. The base plate 102 is substantially rectangular in shape and includes a first end 108, an opposing second end 110, and a pair of sides 112 extending between the first end 108 and the second end 110. The base plate 102 defines centerline CL extending in a direction from the first end 108 to the second end 110 between the sides 112. In other examples, the base plate 102 may be a polygonal shape having more or less than four sides, or may include irregularly shaped or arcuate sides.

With continued reference to FIGS. 3-15, the mold 100 includes a plurality of protrusions 114 formed on the lower surface 106 of the base plate 102. As shown, each of the protrusions 114 includes one or more sidewalls 116 extending from the lower surface 106 to a planar, distal end wall 118. As shown in FIGS. 6, 10, and 14, a distance from the lower surface 106 to the distal end wall 118 defines a height $H_P$ of each of the protrusions 114. In the illustrated example, each of the protrusions 114 has the same height $H_P$. Additionally or alternatively, some of the protrusions 114 may have different heights $H_P$ from others. For example, a height $H_P$ of at least one of the protrusions 114 may be half of the height of at least one of the other protrusions 114, and may be configured to form comestible blocks B that are half of the height of other comestible blocks B.

As shown, each of the protrusions 114 defines a cavity 120 having an opening 122 formed through the thickness of base plate 102, whereby the cavity 120 is accessible through the upper surface 104 of the base plate 102. Particularly, the cavities 120 of each of the protrusions 114 are defined by inner surfaces of the sidewalls 116 and the distal end wall 118. In the illustrated examples, the cavities 120 are tapered in width along a direction from the base plate 102 to the distal end wall 118, and are configured to form comestible blocks B having tapered widths. As shown, the tapered widths of the cavities 120 correspond to an oblique angle of the sidewalls 116 with respect to the base plate 102. For example, the sidewalls 116 may have a constant thickness and extend at an oblique angle with respect to the base plate 102, whereby the sidewalls 116 converge with each other along a direction from the base plate 102 to the distal end wall 118. In other examples, the tapers of the cavities 120 may be provided by a change in thickness of the sidewalls 116.

The protrusions 114 further include at least one boss 126 extending from the distal end wall 118. In the illustrated example, the bosses 126 are frustoconical in shape, whereby an annular sidewall 128 of each boss 126 tapers inwardly in a direction from the distal end wall 118 to a planar tip 130 of the boss 126. A distance from lower surface 106 of the base plate 102 to the planar tip 130 of each boss 126 defines a boss height Hs that is greater than the height $H_P$ of the protrusion. As discussed in greater detail below, the heights $H_P$, $H_B$ of the protrusions 114 and the bosses 126 are selected so that the bosses 126 of an upper mold 100a, 100c of the system 10 (that is, stacked molds) extend into the cavities 120 of a lower mold 100a, 100b of the system 10 to form corresponding depressions in a formed comestible block B.

In some examples, the protrusions 114 include at least one pair of the bosses 126 aligned with each other along a first horizontal direction to form a row of the bosses 126. Additionally or alternatively, the protrusions 114 may include at least one pair of the bosses 126 aligned with each other along a second horizontal direction that is perpendicular to the first horizontal direction to form a column of the bosses 126. The bosses 126 forming each row are spaced apart from each other by the same distance as the bosses 126 forming each column. Accordingly, a first one of the molded comestible blocks B can be rotated ninety degrees with respect to a second one of the molded comestible blocks B when the blocks B are stacked.

Each of the bosses 126 defines a corresponding recess 132 in fluid communication with the respective cavity 120 of the protrusion 114 on which the boss 126 is formed. The recesses 132 have a profile corresponding to an outer profile of the boss 126. Accordingly, the cavity 120 and the recesses 132 cooperate to define an outer profile of a stackable comestible block B having tapered sides and one or more pegs extending therefrom, while the bosses 126 of a second one of the molds are configured to be received within each of the cavities 120 to form depressions on an opposite side of the comestible block B from the pegs, as discussed below.

In some examples, the distal end wall 118 includes one or more indentations 134 formed therein. The indentations 134 may protrude into the cavity 120 of the protrusion to form a corresponding dimple in a top surface of the comestible block B. In the illustrated example, one of the indentations 134 is centrally located between four of the bosses 126. For example, a "two-by-two" protrusion 114, 114a, 114c, 114d including just four of the bosses 126 may include a single indentation 134, while a "two-by-four" protrusion 114, 114b having eight of the bosses 126 may include three of the indentations 134. These indentations 134 advantageously minimize the likelihood of the comestible blocks B becoming stuck within the cavities 120 by providing discrete mold release initiation points within the cavity 120.

With reference to FIGS. 3-7, one example of the mold 100, 100a includes a plurality of two-by-four, rectangular protrusions 114a, a plurality of two-by-two, square protrusions 114b, and a plurality of two-by-two, circular protrusions 114c all extending the same height $H_P$ from the lower surface 106 of the base plate 102. In the illustrated example, the mold 100a includes four of the rectangular protrusions 114a, two of the square protrusions 114b, and two of the circular protrusions 114c. Other examples of protrusions combinations are also possible depending on the configuration of the mold and the desired shape and quantity of the comestible blocks B to be formed.

Each of the rectangular protrusions 114a includes an opposing pair of short sidewalls 116a and a pair of long sidewalls 116b extending between the short sidewalls 116a to form the elongate, rectangular protrusion 114a. Each of the sidewalls 116a, 116b extends at an oblique angle from the base plate 102 to an elongate distal end wall 118a. Accordingly, the sidewalls 116a, 116b define a tapered elongate cavity 120a having a width and a length that decrease along the direction from the base plate 102 to the distal end wall 118a. The distal end wall 118a has eight of the bosses 126 arranged in four rows of two bosses 126 each, thereby defining two columns having four bosses 126 each. As discussed above, the distal end wall 118a may further include three of the indentations 134 interposed between the adjacent rows and columns of the bosses 126.

Each of the square protrusions 114b includes four of the short sidewalls 116a arranged in a square configuration to define a square cavity 120b having an equal length and width. As with the rectangular protrusion 114a, each of the short sidewalls 116a of the square protrusions 114b extends at an oblique angle from the base plate 102 to a square distal end wall 118b. Accordingly, the sidewalls 116a define a tapered square cavity 120b having a length and width that decreases along a direction from the base plate 102 to the distal end wall 118b. The distal end wall 118b of the square protrusion 114b has four of the bosses 126 arranged in two rows of two bosses 126 each, thereby defining two columns having two bosses 126 each. A single indentation 134 is interposed between the four bosses 126 on the distal end wall 118b.

Each of the circular protrusions 114c includes a single, annular sidewall 116c to define a cavity 120c having a frustoconical shape. As with the other protrusions 114a, 114b having straight sidewalls 116a, 116b, the annular sidewall 116c of the circular protrusions 114c extends at an oblique angle from the base plate 102 to a circular distal end wall 118c. Accordingly, the annular sidewall 116c defines a tapered cavity 120c having diameter that decreases along the direction from the base plate 102 to the distal end wall 118c. The distal end wall 118c of the circular protrusion 114c has four of the bosses 126 arranged in two rows of two bosses 126 each, thereby defining two columns having two bosses 126 each. A single indentation 134 is interposed between the four bosses 126 on the distal end wall 118c.

As shown, the mold 100a is provided with a four of the rectangular protrusions 114a, two of the square protrusions 114b, and two of the circular protrusions 114c each defining a respective cavity 120a-120c. Each of the protrusions 114a-114c includes a distal end wall 118a-118c that includes a full set of bosses 126 for forming corresponding depressions in the bottom of the comestible block B when the molds 100a are stacked. Accordingly, the mold 100a of the first example may be used as both a lower mold 100a that provides cavities 120 for receiving the comestible solution, and as an upper mold 100a whose bosses 126 are received within the cavities 120 of the lower mold 100a to impart the depressions to a bottom of the comestible block B.

With reference to FIGS. 8-11, another example of the mold 100b is similar to the example of the mold 100a shown in FIGS. 3-7. However, instead of including the circular protrusions 114c, the mold 100b includes sloped protrusions 114d. In contrast to the protrusions 114a-114c described above, the sloped protrusions 114d each include a short sidewall 116a extending from the base plate 102 to a distal end wall 118d and an opposing truncated sidewall 116d having a height that is less than a height of the short sidewall 116a. The distal end wall 118d has a pair of the bosses 126, and a sloped end wall 136 that extends at an oblique angle with respect to the base plate 102, and between the distal end wall 118d and the truncated sidewall 116d. Accordingly, the height $H_P$ of each of the sloped protrusions 114d decreases continuously in a direction from the distal end wall 118d to the truncated sidewall 116d. In some approaches, the sloped end wall 136 is planar and does not include any of the bosses 126. The sloped protrusion 114d may include one of the indentations 134 formed at an intersection of the distal end wall 118d and the sloped end wall 136.

Unlike the first example of the mold 100a, which can be used as both a lower mold and an upper mold, the second example of the mold 100b is configured, in some approaches, to be provided as a lower mold of the system 10. In contrast to the mold 100a, whereby each of the protrusions 114a-114 includes a full set of the bosses 126 for forming the corresponding depressions in the comestible blocks B, the sloped protrusions 114d include only two bosses 126. Accordingly, while the mold 100b could be used as an upper mold, the resulting sloped comestible block B would only be provided with two depressions formed in the bottom thereof. Accordingly, when the mold 100b including the sloped protrusions 114b is used, the cover mold 100c is provided as the upper mold to form the desired depressions in the comestible block B, as discussed below. The cover mold 100c may also be used in combination with the mold 100a having the circular protrusions 114c.

With reference to each of the molds 100a, 100b described above, the cavities 120a-120d defined by the protrusions 114a-114d of each of the molds 100a, 100b collectively define a mold cavity volume V. In some examples, the mold cavity volume V for each mold 100a, 100b is configured to be filled by an amount of a comestible solution S when the system 10 is used. In some approaches, the amount of comestible solution S provides a comestible volume SV that is equal to or less than the total mold cavity volume V of all combined cavities 120a-120d within an individual mold. In other words, the comestible solution S is received within the mold cavities and the generally flat areas between the cavities is substantially free of comestible solution S when in use. In one implementation, the amount of comestible solution S, when dissolved or reconstituted with fluid, is an amount to provide a volume SV that fills the mold cavities in one mold to a level such that the protrusions of an upper mold extend into the comestible solution S when the molds are in a stacked configuration as discussed herein. In one approach, the comestible solution S is a powdered gelatin or powdered gelatin mix configured to be dissolved in or reconstituted with a fluid (such as water) and set into a gelatin-like consistency (typically after refrigeration). When added to the molds and used as described herein, the molds form gelatin comestible blocks B that can be stacked. Accordingly, the molds 100a, 100b are configured to accommodate the comestible solution S formed by dissolving a powdered gelatin mix in an amount of water. In some approaches, the comestible solution S may be about 10 to about 20 ounces of a powdered gelatin mix that can be dissolved or reconstituted with about 1 to about 5 ounces of water.

Referring to FIGS. 12-15, yet another example of the mold 100 is configured to function as a cover mold 100c for either one of the aforementioned molds 100a, 100b, whereby the bosses 126 of the cover mold 100c are configured to be received within respective cavities 120 of one of the molds 100a, 100b when the molds 100a-100c are stacked. In the illustrated example the cover mold 100c includes a plurality of "two-by-four" protrusions 114e and a plurality of "two-by-two" protrusions 114f. In contrast to the protrusions 114a-114d of the molds 100a, 100b, which have planar outer sidewalls 116 extending between the base plate 102 and a distal end walls 118, the outer peripheries of the protrusions 114e, 114f are defined in part by frustoconical sidewalls 128 of each of the bosses 126, which extend from the base plate 102 to the planar tips 130 of the bosses 126.

Adjacent ones of the sidewalls 128 of the bosses 126 may be interconnected with each other by arcuate sidewall segments 138. Like the sidewalls 128 of the bosses 126, the sidewalls segments 138 extend at an oblique angle with respect to the base plate 102 to a distal end wall 118e, 118f, such that widths of the protrusions 114e, 114f taper in a direction from the base plate 102 to the distal end wall 118e, 118f. Alternatively, the bosses 126 may be formed as independent bodies extending from the lower surface 106 of the base plate 102 to the tips 130, absent a distal end wall and sidewall segments.

In some examples, the sidewalls 128, the sidewall segments 138, and the distal end walls 118e, 118f may cooperate to define respective cavities within the protrusions 114e, 114f. However, because the cover mold 100c is provided to the system 10 primarily as an upper mold for imparting the depressions into the bottom of the comestible block B formed by the cavities 120 of the lower molds 100a, 100b, the protrusions 114e, 114f of the cover mold 100c may be formed solidly, without cavities.

With continued reference to FIGS. 3-15, the molds 100, 100a-100c are each formed with at least one support leg 140 extending from the lower surface 106 of the base plate 102. Each of the support legs 140 is semi-frustoconical, and includes a planar outer sidewall 142 and an arcuate inner sidewall 144 each extending from the base plate 102 to a terminal end 146. The arcuate inner sidewall 144 forms a convex outer surface and a concave inner surface of the support leg 140. Accordingly and in some approaches, the support leg 140 has a substantially D-shaped cross-section. The outer sidewall 142 is substantially perpendicular to the base plate 102, while the inner sidewall 144 is formed at an oblique angle with respect to the base plate 102 such that a width or radius of the support leg 140 tapers along a direction from the base plate 102 to the terminal end 146.

The sidewalls 142, 144 of the support leg 140 cooperate with each other to define a void 148 having an opening formed through the base plate 102. Accordingly, the void 148 of each of the support legs 140 can be accessed through the upper surface 104 of the base plate. The tapered shape of the support legs 140 allow a support leg 140 of a first one of the molds 100a-100c to be received within the void 148 of a second one of the molds 100a-100c when two or more of the molds 100a-100c are stacked upon each other (for example, when in a storage configuration of the molds).

As shown in FIGS. 6, 10, and 14, a distance between the terminal end 146 of the support leg 140 and the lower surface 106 of the base plate 102 defines a height $H_{SL}$ of the support leg 140. In some configurations of the mold 100a, 100b, the height $H_{SL}$ of the support leg is the same as the height $H_P$ of the protrusions 114a-114d and less than the height $H_B$ of the bosses 126, whereby when the molds 100a, 100b are stacked upon each other in a molding configuration, the distal ends 146 of the support legs 140 are configured to engage the upper surface 104 of the base plate 102 to suspend the bosses 126 of the upper mold 100a, 100b a distance within the cavities 120a-120d of the lower mold 100a, 100b (in order to form depressions in a formed comestible block B). Alternatively, the heights $H_{SL}$ of the support legs 140 may be greater than the heights $H_B$ of the bosses 126, whereby the support legs 140 of the cover mold 100c are inserted through the base plate 102 into the voids 148 of corresponding support legs 140 of the lower mold 100a, 100b to align the cover mold 100c and the lower mold 100a, 100b.

With continued reference to the figures, each of the molds 100a-100c includes a first pair of the support legs 140 disposed along the first end 108 of the base plate 102, and a second pair of the support legs 140 disposed along the second end 110 of the base plate 102. As shown, the support legs 140 are arranged such that the planar sidewalls 142 are adjacent to the respective ends 108, 110 along which the support legs 140 are disposed, and the convex sidewalls 144 face inwards towards the opposite end 108, 110. The first pair of the support legs 140 are spaced apart from each other along the first end 108 by a first distance $D_1$, and are symmetrically arranged on opposite sides of the centerline CL of the base plate 102. Similarly, the second pair of the support legs 140 are spaced apart from each other along the second end 110 by a second distance $D_2$, and are symmetrically arranged on opposite sides of the centerline CL from each other. The first distance $D_1$ is greater than the second distance $D_2$ such that the support legs 140 on the first side 108 are offset outwardly from the support legs 140 on the second side 110 with respect to the centerline CL.

When a first, upper mold 100a, 100c is stacked on a second, lower mold 100a, 100b such that each of the molds 100a, 100c is in the same orientation, the terminal ends 146 of the first pair of support legs 140 of the upper mold 100a-100c are configured to be received within the voids 148 of the first pair of support legs 140 of the lower mold 100a, 100b, and the terminal ends 146 of the second pair of support legs 140 of the upper mold 100a, 100c are configured to be received within the voids 148 of the second pair of support legs 140 of the lower mold 100a, 100b (a storage configuration). However, when the upper mold 100a, 100c is rotated 180 degrees about a vertical axis with respect to the lower mold 100a, 100c, the first and second pairs of the support legs 140 of the upper mold 100a, 100c will be offset from the corresponding second and first pairs of support legs 140 of the lower mold 100a, 100b, preventing the support legs 140 of the upper mold 100a, 100c from engaging the voids 148 of the lower mold 100a, 100b (a molding configuration).

The molds 100a, 100c further include one or more sockets 150 formed in or on the upper surface 104 of the base plate 102. Generally, each one of the sockets 150 is formed adjacent to one of the support legs 140, such that the support legs 140 of one of the upper molds 100a, 100c are configured to be received in the sockets 150 of one of the lower molds 100a, 100b when the molds 100a-100c are rotated 180 degrees from each other, as discussed below when in the molding configuration.

Figure 3:
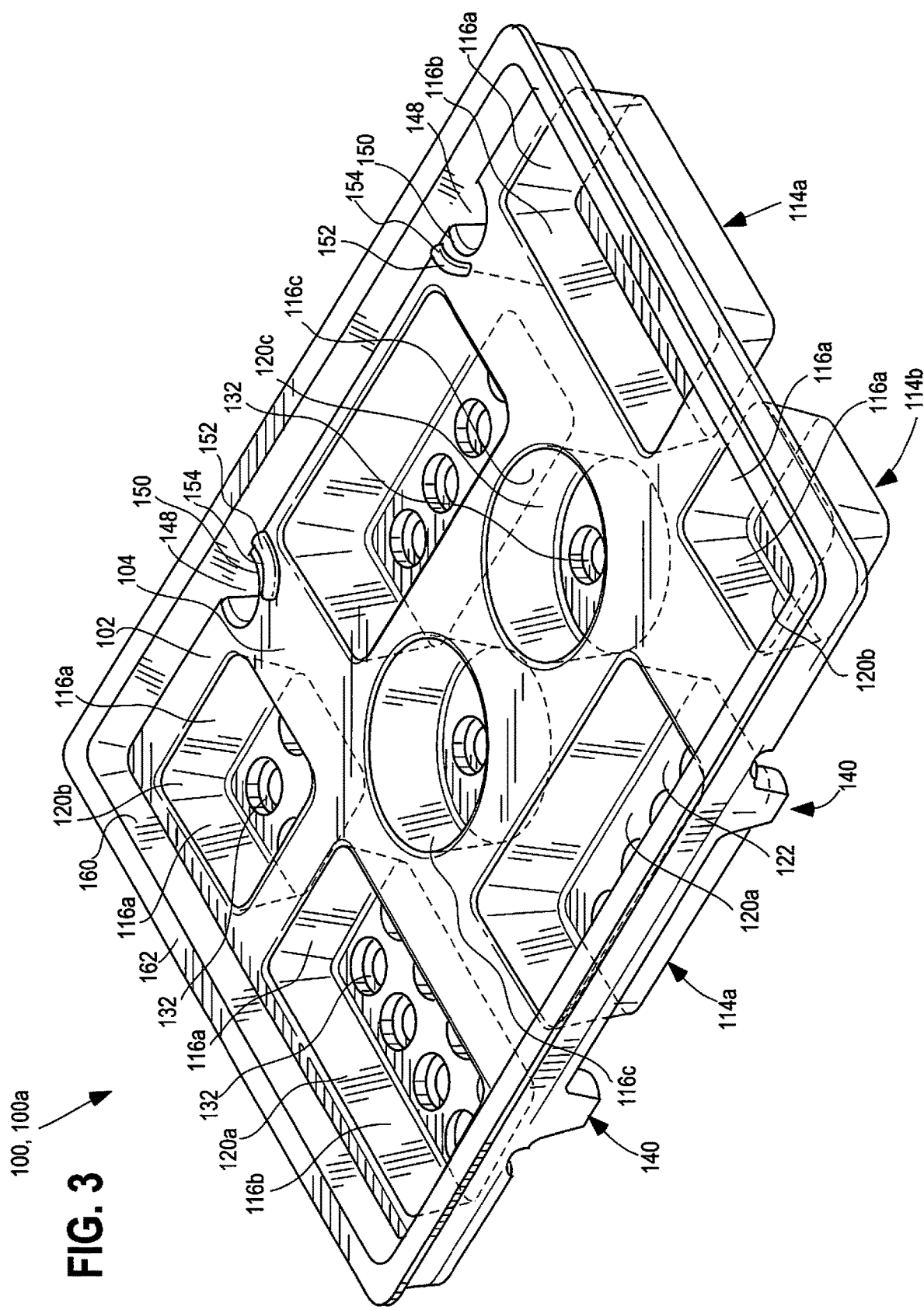
FIG. 3 is a top perspective view of a mold in accordance with the principles of the present disclosure.
Figure 4:
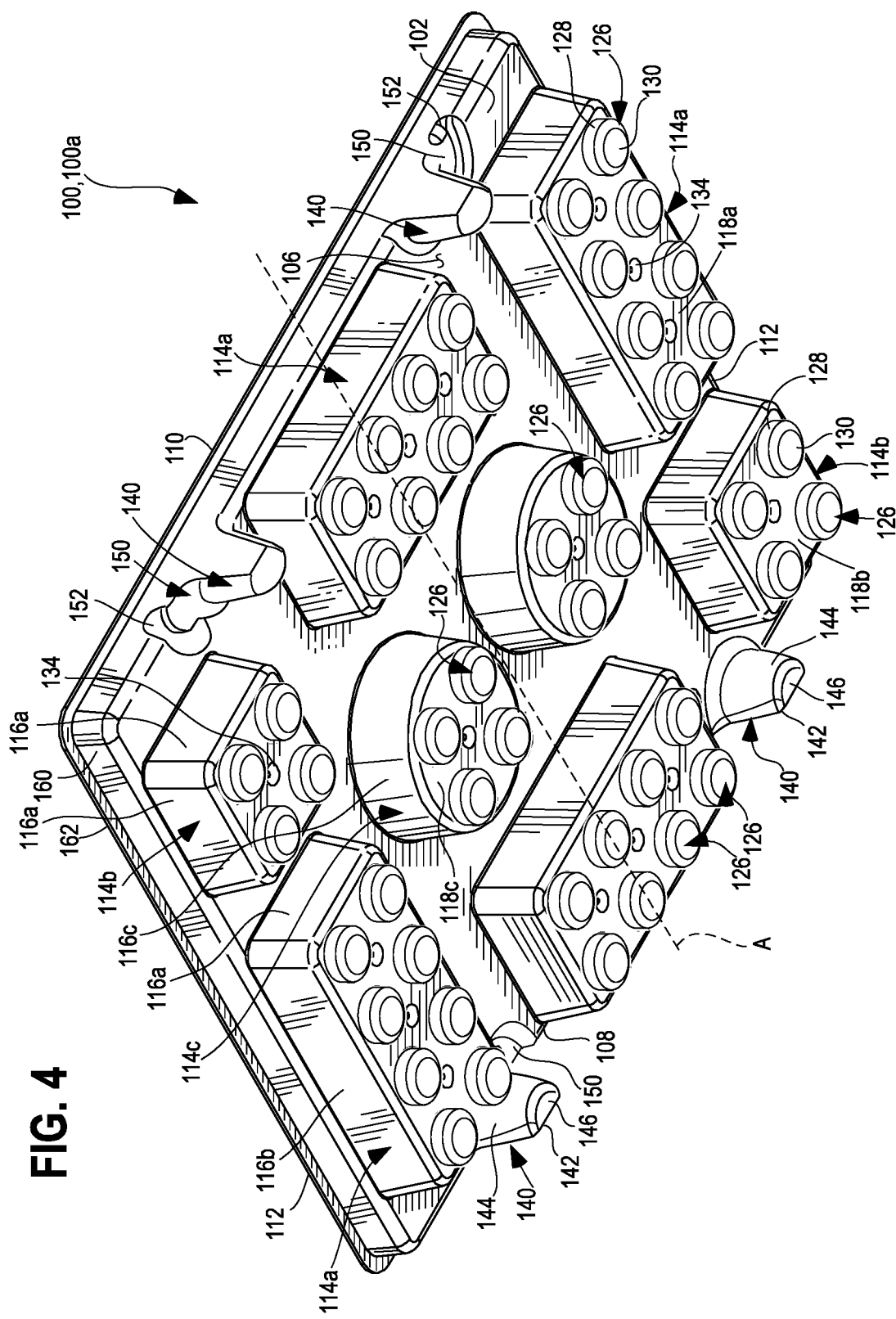
FIG. 4 is a bottom perspective view of the mold of FIG. 3.
Figure 5:
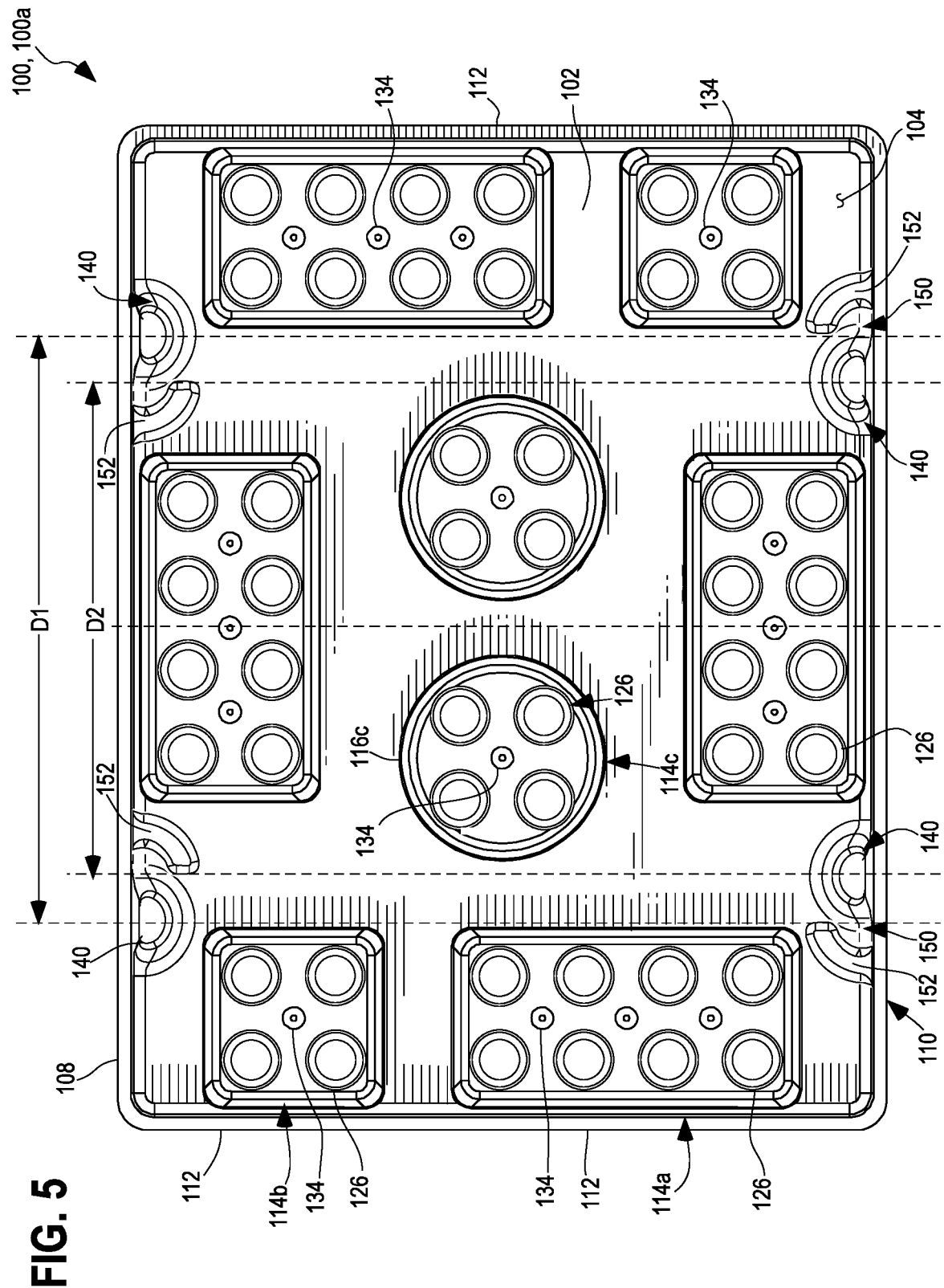
FIG. 5 is a bottom plan view of the mold of FIG. 3.
Figure 8:
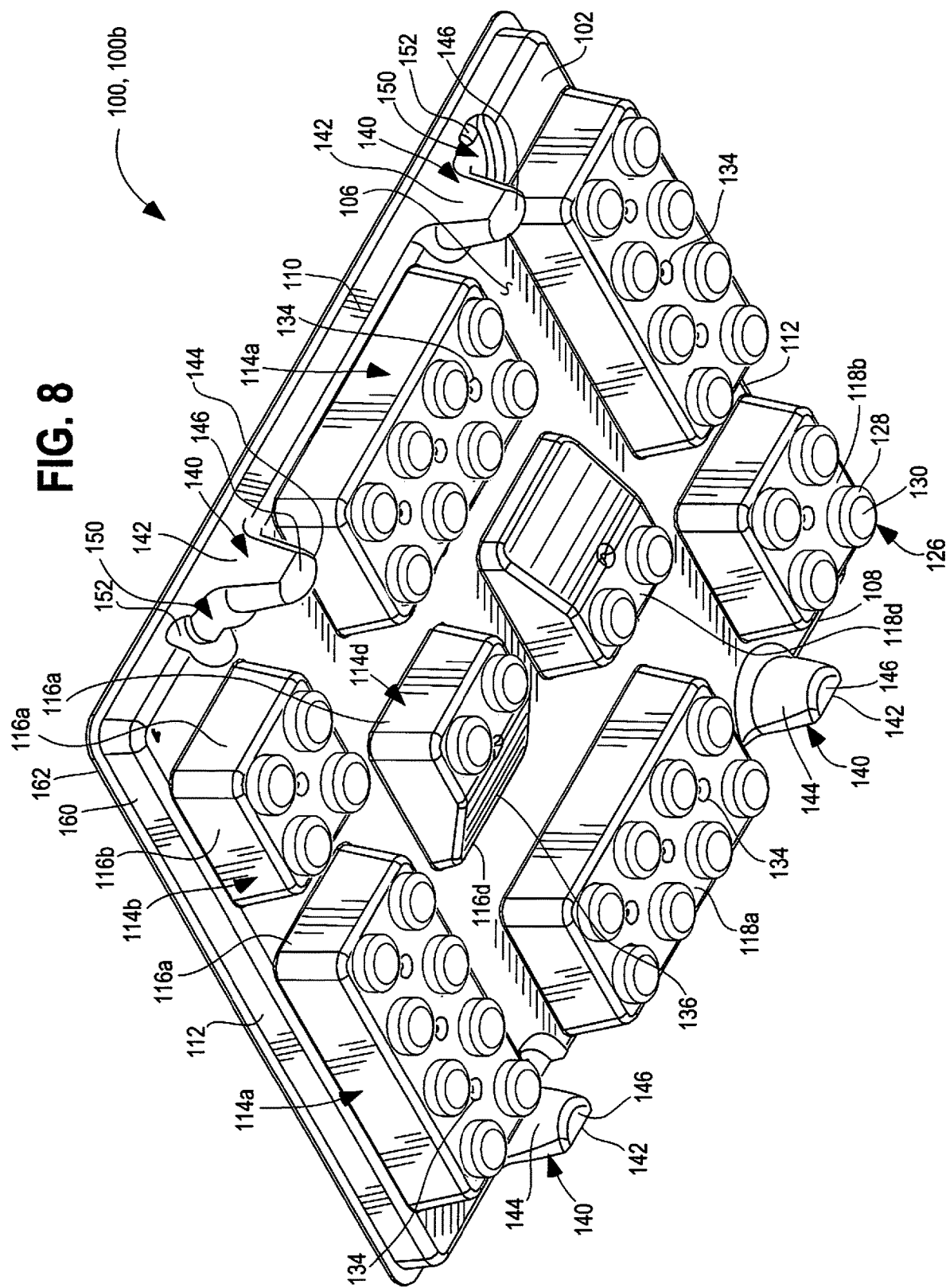
FIG. 8 is a bottom perspective view of a mold in accordance with the principles of the present disclosure.
Figure 9:
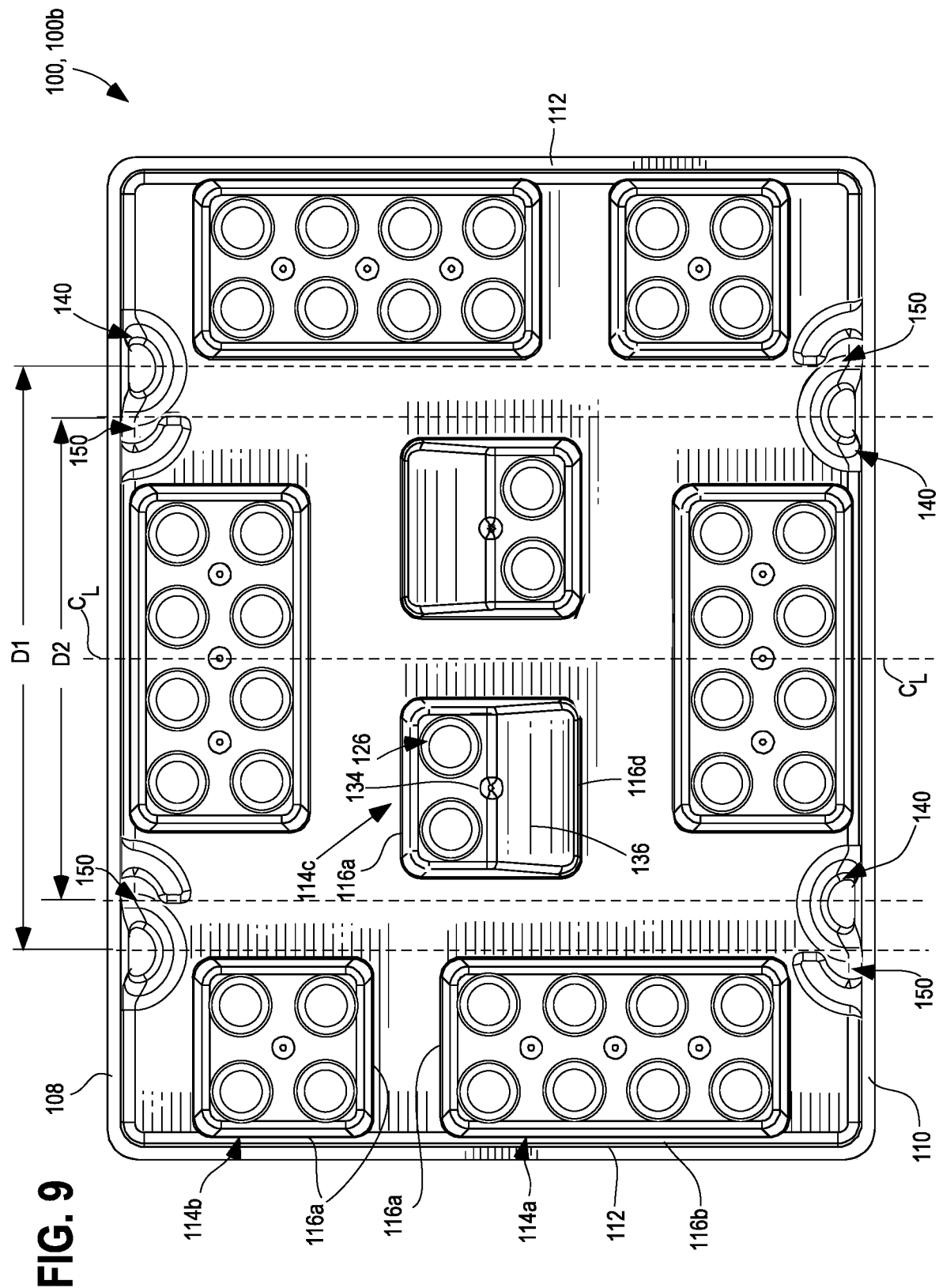
FIG. 9 is a bottom plan view of the mold of FIG. 8.
Figure 12:
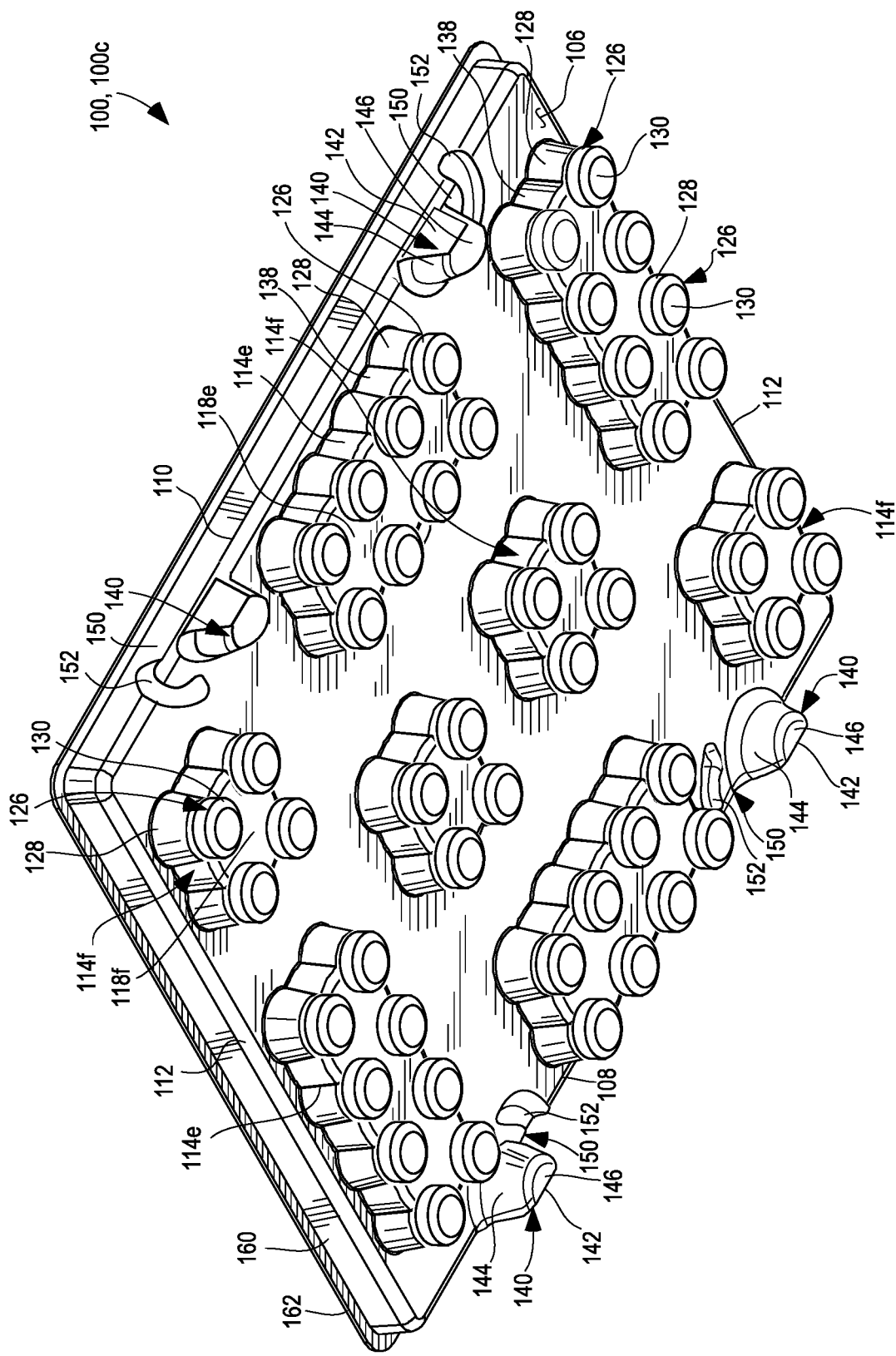
FIG. 12 is a bottom perspective view of a mold in accordance with the principles of the present disclosure.
Figure 13:
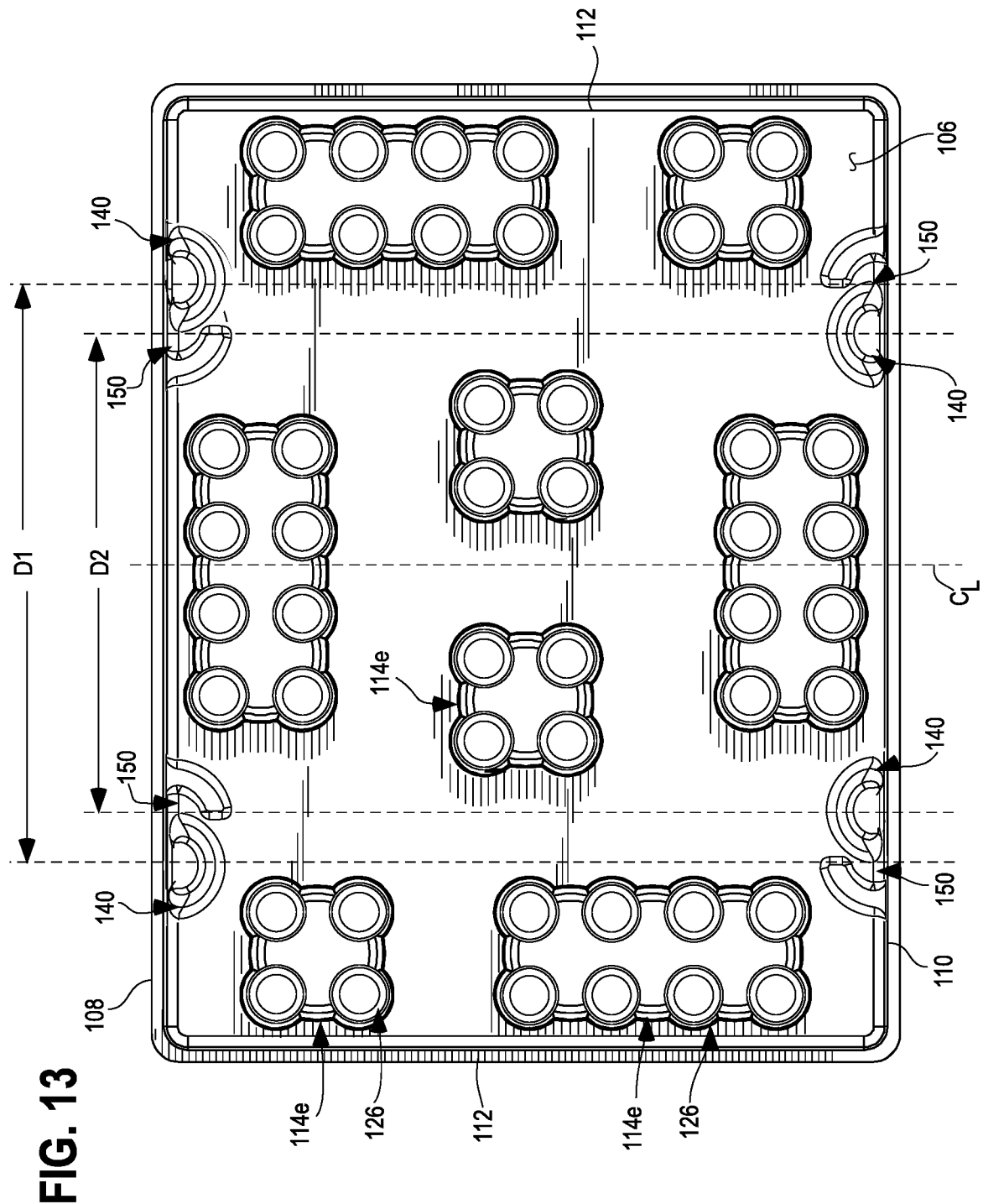
FIG. 13 is a bottom plan view of the mold of FIG. 12.

Referring to FIG. 3, each of the sockets 150 is defined in part by a rib 152 protruding from the upper surface 104 of the base plate 102 in an opposite direction from the support legs 140. More specifically, an inner sidewall 154 of the rib 152 cooperates with the upper surface 104 of the base plate 102 plate to define one of the sockets 150, whereby the upper surface 104 is configured to interface with the terminal end 146 of a respective one of the support legs 140 when the molds 100a-100c are stacked, while the inner sidewall 154 of the rib 152 is configured to interface with the inner sidewall 144 of the support leg 140. In the illustrated example, the inner sidewall 154 of the rib 152 is arcuate and has a concave profile corresponding to the convex inner sidewall 144 of the support leg 140. In other examples, the inner sidewall 144 of the support leg 140 and the inner sidewall 154 of the rib 152 may be a different shape.

As shown, each of the molds 100a-100c includes a first pair of the sockets 150 disposed along the first end 108 of the base plate 102, and a second pair of the sockets 150 disposed along the second end 110 of the base plate 102. The first pair of the sockets 150 are spaced apart from each other along the first end 108 by the second distance $D_2$, and are symmetrically arranged on opposite sides of the centerline CL from each other. Similarly, the second pair of the sockets 150 are spaced apart from each other along the second end 110 by the first distance $D_2$, and are symmetrically arranged on opposite sides of the centerline CL from each other. Accordingly, the first pair of the sockets 150 at the first end 108 of the base plate 102 are spaced apart from each other by the same distance $D_2$ as the second pair of support legs 140 at the second end 110 of the base plate 102, while the second pair of the sockets 150 at the second end 110 of the base plate 102 are spaced apart from each other by the same distance $D_1$ as the first pair of the support legs 140 at the first end 108 of the base plate 102. As provided above, the first distance $D_1$ is greater than the second distance $D_2$. Thus, the first pair of the sockets 150 are disposed between the first pair of the support legs 140 at the first end 108, while the second pair of the sockets 150 straddle the support legs 140 at the second end 110.

The first distance $D_1$ and the second distance $D_2$ may be selected so that each of the sockets 150 is disposed adjacent to one of the support legs 140. As shown in the figures, the ribs 152 forming each of the respective sockets 150 are adjacent to respective ones of the support legs 140, whereby the rib 152 terminates at an end adjacent to the inner sidewall 144 of the support leg 140. Thus, the socket 150 may not be fully defined by the rib 152 and may only receive a portion of the terminal end 146 of the support leg 140. As shown in one example, the inner sidewall 154 of the rib 152 defines a quarter circle shape for receiving half of a terminal end 146 of a support leg 140. In some examples, the difference between the first distance $D_1$ and the second distance $D_2$ may be greater, so that the sockets 150 are spaced apart from the support legs 140. In these examples, the sockets 150 may be fully defined by the rib 152 so that socket 150 is configured to receive the entire terminal end 146 of a support leg 140.

As described above, the molds 100a-100c are configured so that the first pair of support legs 140 of an upper mold 100a, 100c can be received in the second pair of the sockets 150 of a lower mold 100a, 100b, and the second pair of the support legs 140 of the upper mold 100a, 100c can be received in the first pair of the sockets 150 of the lower mold 100a, 100b when the upper mold 100a, 100c is rotated 180 degrees about a vertical axis with respect to the lower mold 100a, 100b. Thus, as provided above and described in greater detail below, when the lower mold 100a, 100b and the upper mold 100a, 100c are in the same orientation, the support legs 140 of the upper mold 100a, 100c will be received by the support legs 140 of the lower mold 100a, 100b so that the system 10 can be placed in a storage configuration. In contrast, when the upper mold 100a, 100c is rotated 180 degrees with respect to the lower mold 100a, 100b, the support legs 140 of the upper mold 100a, 100c will be received in the sockets 150 of the lower mold 100a, 100b to place the system 10 in a molding configuration.

A distance between the terminal end 146 of the support leg 140 and the lower surface 106 of the base plate 102 defines a height $H_{SL}$ of each of the support legs 140. In some configurations of the system 10, the height $H_{SL}$ of the support leg 140 is the same as the height $H_P$ of the protrusions 114a-114e and less than the height $H_B$ of the bosses 126, whereby when the molds 100, 100a-100c are stacked upon each other, the distal ends 146 of the support legs 140 are configured to engage the upper surface 104 of the base plate 102 to suspend the bosses 126 of the upper mold 100a, 100c within the cavities 120a-120d of the lower mold 100a, 100b. Alternatively, the heights $H_{SL}$ of the support legs 140 may be greater than the heights $H_B$ of the bosses 126, whereby the support legs 140 of the upper mold 100a, 100c are inserted through the base plate 102 into the voids 148 of corresponding support legs 140 of the lower mold 100a, 100b to align the upper mold 100a, 100c and the lower mold 100a, 100b.

Each of the molds may further include a lip 160 extending upwardly from an outer periphery of the base plate 102. Accordingly, the lip 160 extends continuously along each of the ends 108, 110 and the sides 112. The lip 160 may further include a flange 162 extending outwardly therefrom. The lip 160 and the flange 162 cooperate to provide desired rigidity to the molds 100a-100c, and to provide a gripping area for handling of the molds 100a, 100c.

In addition to the molds 100a-100c, the system 10 may be provided with one or more package or pouch or ingredients I for forming the comestible block B. For example, the system 10 may be provided with a package of gelatin powder (which may be about 1 to about 5 ounces), which can be mixed with water or other fluid (preferably warm or boiling water) to provide about 10 to about 20 ounces of a comestible solution S for forming the comestible blocks B in the mold. As discussed above, the cavities 120 of the molds 100a, 100b may collectively define a mold cavity volume V of about 10 to about 20 ounces (and in some approaches where the comestible volume SV is equal to or slightly less than the mold cavity volume V of an individual mold), whereby a single package of gelatin mix is configured to fill or slightly fill all of the cavities 120 of one of the lower molds 100a, 100b when the upper mold 100a, 100c is stacked thereon so that the protrusions of an upper, stacked mold extend into the comestible solution received within the cavities of a lower mold when the molding system 10 is in a molding configuration. The combined molds in the molding configuration is then cured or set, typically through refrigeration (such as chilling for 1 to 3 hours, and in some approaches, about 2 hours).

With reference to FIGS. 16A-16D, one example of a method of transforming the system 10 from a storage configuration to a molding configuration is shown. In the illustrated example, a single pair of molds 100a are shown to demonstrate the transition of the system 10 from a storage configuration to a molding configuration. Accordingly, the molds 100a are respectively referred to as an upper mold 100a and a lower mold 100b. However, as discussed above, the system 10 may be provided with various combinations of the molds 100, 100a, 100b, 100c. Accordingly, the steps provided below will similarly apply to the examples of the system 10, 10a, 10b shown in FIGS. 1 and 2, whereby the system 10, 10a, 10b includes lower molds 100a, 100b and a cover mold 10c. Alternatively, the system 10 may include more than two of the molds 100a, 100b, and a cover mold 100c.

Referring to the example FIGS. 16A-16D, in the storage configuration the upper mold 100, 100a and the lower mold 100, 100a are in the same orientation, such that the terminal ends 146 of the support legs 140 of the upper mold 100, 100a, are received in the voids 148 of the support legs 140 of the lower mold 100, 100a. With reference to FIG. 16B, the system is moved or shifted from the storage configuration by lifting the upper mold 100, 100a from the lower mold 100, 100a, as indicated by the arrows 1.

Once the molds 100, 100a are separated from each other, a volume of the comestible solution SV is formed by dissolving the comestible ingredient I in water or other fluid. In one illustrated example, about 3 ounces of the comestible ingredient I is dissolved in about 16 ounces of water to provide about 16 ounces of the comestible solution S. The comestible solution is then distributed among the cavities 120 of the lower mold 100a.

With the cavities 120 of the lower mold 100, 100a filled, the upper mold 100, 100a is positioned above the lower mold 100, 100a with the protrusions 200 facing downward. The upper mold 100, 100a is then rotated 180 degrees about a vertical axis $A_V$ with respect to the lower mold 100, 100a, such that the first pair of the support legs 140 on the first end 108 of the upper mold 100a are vertically aligned with the second pair of sockets 150 on the second end 110 of the lower mold 100a and the second pair of the support legs 140 are vertically aligned with the first pair of the sockets 150 on the first end 108 of the lower mold 100, 100a, as illustrated by the arrow 2 in FIG. 16C.

The system 10 is then moved to the molding configuration, wherein the upper mold 100, 100a is lowered onto the lower mold 100, 100a so that the support legs 140 of the upper mold 100, 100a are received within the sockets 150 of the lower mold 100, 100a, as indicated by the arrows 3 in FIGS. 16C and 16D. As discussed above, the heights $H_{SL}$ of the support legs of the mold 100, 100a are configured so that when the upper mold 100, 100a and the lower mold 100, 100a are stacked in the molding configuration, the bosses 126 of the upper mold 100, 100a extend a short distance into the respective cavities 120 of the lower mold 100, 100a, as shown in FIG. 16D. More specifically and when in the molding configuration, the bosses 126 of an upper mold extend into the comestible solution S disposed within each of the cavities 120, thereby forming the depressions in a bottom surface of the set or cured comestible blocks B (such as after refrigeration of the system). Accordingly, the recesses 132 formed by the bosses 126 of the lower mold 100, 100a will form pegs on a top side of a formed comestible blocks B and the bosses 126 of the upper mold 100, 100a will impart the depressions on the bottom of a formed comestible block B, whereby the pegs are configured to be received within the depressions when two or more of the formed comestible blocks B are stacked upon each other.

Once the comestible blocks B are set or cured within the system 10, the comestible blocks B can be removed from each of the respective cavities 120. As discussed above, the indentations 134 formed in the distal end wall 118 of each protrusion 114 may function as mold release initiation points for breaking vacuum between the distal end wall 118 and the comestible block B so that the comestible block B can be easily removed from each of the cavities 120. The tapered sidewalls 116, 128 of the protrusions 114 and the bosses 126 further ease the removal of the comestible block B by providing clearance between the comestible block B and the cavity 120 once the comestible block B is initially released. In some approaches, a release solution or coating (such as common cooking spray) may optionally be applied to the inners surfaces of a mold cavity of a lower mold and also to the outer protrusion surfaces of an upper mold.

In examples of the system including additional ones of the molds 100, 100a, 100b, 100c, each subsequently stacked mold 100, 100a, 100b, 100c would be manipulated in the foregoing manner with respect to the preceding one of the molds 100, 100a, 100b, 100c to transition the system from the storage configuration to the molding configuration. For example, where the system 10a includes two of the molds 100a described above, and further includes a cover mold 100c, the second, intermediate mold 100a will be rotated 180 degrees about the vertical axis $A_V$ with respect to the first, lower mold 100a, while the third, cover mold 100c will be oriented the same as the first, lower mold 100a. Put another way, in the storage configuration each of the molds 100 is oriented the same with respect to the vertical axis $A_V$, and in the molding configuration the orientations of subsequent ones of the molds 100 alternate 180 degrees with respect to the vertical axis $A_V$.

Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

Like reference numerals are used in the figures to identify common elements. Reference numerals including letter suffixes are used to identify alternative or modified examples of common elements. Accordingly, use of the base reference numeral without a reference numeral is intended to generically include to all alternative examples of a common element. For example, reference to mold 100 includes any one of the examples of the molds 100a-100c described herein.

A number of implementations have been described. Nevertheless, it will be understood that various modifications may be made without departing from the spirit and scope of the disclosure. Accordingly, other implementations are within the scope of the following claims.

What is claimed is:

1. A mold system comprising:
   a lower mold including:
      a lower base plate including a lower surface and an upper surface disposed on an opposite side thereof;
      at least one protrusion extending a first height from the lower surface of the lower base plate to a distal end wall and defining a mold cavity accessible through an opening of the lower base plate, and one or more bosses extending a second height from the distal end wall;
      at least one support leg extending a third height from the lower surface of the lower base plate to a terminal end, wherein the at least one support leg of the lower mold comprises a sidewall that defines a void and the void is accessible through the upper surface of the lower base plate;
      at least one socket formed on the upper surface of the lower base plate adjacent the at least one support leg, wherein the at least one socket is at least partially defined by a rib protruding from the upper surface of the lower base plate; and
   an upper mold including:
      an upper base plate including a second lower surface and a second upper surface disposed on an opposite side thereof;
      a plurality of bosses extending from the second lower surface;
      at least one support leg extending from the second lower surface and having a distal end thereof, wherein the at least one support leg of the upper mold comprises a sidewall that defines a void and the void is accessible through the second upper surface of the upper base plate; and
      the distal end of the upper mold at least one support leg configured to engage the upper surface of the lower base plate and sized to suspend at least one of the plurality of upper mold bosses within the mold cavity of the at least one lower mold protrusion when the upper mold is stacked with the lower mold.

2. The mold system of claim 1, wherein the at least one support leg of the lower mold further includes:
   a first pair of support legs extending the third height from the lower surface adjacent to a first end of the lower base plate, the first pair of support legs spaced apart from each other by a first distance along the first end, and
   a second pair of support legs extending the third height from the lower surface adjacent to a second end of the lower base plate, the second pair of support legs spaced apart from each other by a second distance along the second end, the first distance being greater than the second distance.

3. The mold system of claim 2, wherein the at least one socket includes:
   a first pair of sockets formed on the upper surface adjacent to the first end of the lower base plate, the first pair of sockets spaced apart from each other by the second distance along the first end, wherein each of the first pair of sockets is at least partially defined by a respective rib protruding from the upper surface of the lower base plate, and
   a second pair of sockets formed on the upper surface adjacent to the second end of the lower base plate, the second pair of sockets spaced apart from each other by the first distance along the second end, wherein each of the second pair of sockets is at least partially defined by a respective rib protruding from the upper surface of the lower base plate.

4. The mold system of claim 3, wherein the at least one support leg of the upper mold includes:
   third pair of support legs extending a fifth height from the second lower surface adjacent to a third end of the upper base plate, the third pair of support legs spaced apart from each other by the first distance along the third end; and
   a fourth pair of support legs extending the fifth height from the second lower surface adjacent to a fourth end of the upper base plate, the fourth pair of support legs spaced apart from each other by the second distance along the fourth end.

5. The mold system of claim 1, wherein the at least one protrusion includes a plurality of protrusions each having a mold cavity, the mold cavities collectively defining a mold cavity volume.

6. The mold system of claim 5, further comprising a comestible ingredient for forming a volume of a comestible solution for filling the mold cavity volume.

7. The mold system of claim 1, wherein each of the one or more bosses of the lower mold defines a recess in communication with the mold cavity.

8. The mold system of claim 1, wherein the mold cavity is defined by one or more sidewalls of the protrusion extending from the lower surface of the lower base plate to the distal end wall at an oblique angle with respect to the lower base plate.

9. The mold system of claim 1, wherein the third height of the support leg is equal to the first height of the protrusion.

10. The mold system of claim 1, wherein the at least one protrusion includes a first protrusion each having a first quantity of the bosses and a second protrusion having a second quantity of the bosses.

11. A mold system comprising:
    a lower mold including:
      a lower base plate including a lower surface and an upper surface disposed on an opposite side thereof,
      a lower protrusion extending a first height from the lower surface of the lower base plate to a first distal end wall and defining a mold cavity accessible through an opening formed through the lower base plate,
      a lower support leg extending the first height from the lower surface of the lower base plate wherein the lower support leg comprises a sidewall that defines a void and the void is accessible through the upper surface of the lower base plate,
      a socket formed on the upper surface of the lower base plate, wherein the socket is at least partially defined by a rib protruding from the upper surface of the lower base plate; and
    an upper mold including:
      an upper base plate including a lower surface and an upper surface disposed on an opposite side thereof,
      at least one upper protrusion extending the first height from the lower surface of the upper base plate to a second distal end wall,
      one or more bosses extending from the second distal end wall,
      an upper support leg extending the first height from the lower surface of the upper base plate to a terminal end, wherein the upper support leg comprises a sidewall that defines a void and the void is accessible through the upper surface of the upper base plate; and
    wherein a distal end of the upper support leg configured to engage the upper surface of the lower base plate and sized to suspend at least one of the upper mold bosses within the mold cavity of the lower mold protrusion when the upper mold is stacked with the lower mold.

12. The mold system of claim 11, wherein the at least one upper support leg includes:
    a first pair of upper support legs extending the first height from the lower surface of the upper base plate adjacent to a first end of the upper mold, the first pair of upper support legs spaced apart from each other by a first distance along the first end, and
    a second pair of upper support legs extending the first height from the lower surface of the upper base plate adjacent to a second end of the upper mold, the second pair of upper support legs spaced apart from each other by a second distance along the second end, wherein the first distance is greater than the second distance.

13. The mold system of claim 12, wherein the socket includes:
    a first pair of sockets formed in the upper surface of the lower base plate adjacent to a third end of the lower mold, the first pair of sockets spaced apart from each other by the first distance along the third end, wherein each of the first pair of sockets is at least partially defined by a respective rib protruding from the upper surface of the lower base plate; and
    a second pair of sockets formed in the upper surface of the lower base plate adjacent to a fourth end of the lower mold, the second pair of sockets spaced apart from each other by the second distance along the fourth end, wherein each of the second pair of sockets is at least partially defined by a respective rib protruding from the upper surface of the lower base plate.

14. The mold system of claim 11, wherein the mold system is operable between a storage configuration and a molding configuration, the storage configuration having the distal end of the upper support leg received within the void of the lower support leg when the upper mold is in a first orientation with respect to the lower mold, and the molding configuration having the distal end of the upper support leg received within the socket when the upper mold is in a second orientation with respect to the lower mold.

15. The mold system of claim 14, wherein in the second orientation the upper mold is rotated 180 degrees with respect to the first orientation.

16. The mold system of claim 14, wherein in the storage configuration the upper protrusion is received within the mold cavity of the lower protrusion, and in the molding configuration the upper protrusion is disposed above the mold cavity and the one or more bosses are disposed within the mold cavity.

17. The mold system of claim 11, wherein at least one lower protrusion includes a first lower protrusion having a first plurality of the bosses and a second lower protrusion having a second plurality of the bosses.

18. The mold system of claim 11, wherein the mold cavity is defined by one or more sidewalls extending at an oblique angle with respect to the upper base plate.

19. The mold system of claim 11, wherein the at least one lower protrusion includes a plurality of lower protrusions defining a plurality of mold cavities collectively defining a first volume.

20. The mold system of claim 19, further comprising a comestible ingredient for forming a volume of a comestible solution equal to the first volume of the mold cavities.

\* \* \* \* \*